United States Patent
Roeland et al.

(10) Patent No.: US 9,398,470 B2
(45) Date of Patent: Jul. 19, 2016

(54) METHOD AND APPARATUS FOR GATEWAY SESSION ESTABLISHMENT

(75) Inventors: Dinand Roeland, Sollentuna (SE); Johan Nielsen, Uppsala (SE); Maria Belen Pancorbo Marcos, Madrid (ES); Zoltán Turányi, Szentendre (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 965 days.

(21) Appl. No.: 13/517,443

(22) PCT Filed: Nov. 30, 2010

(86) PCT No.: PCT/EP2010/068490
§ 371 (c)(1),
(2), (4) Date: Jun. 20, 2012

(87) PCT Pub. No.: WO2011/082895
PCT Pub. Date: Jul. 14, 2011

(65) Prior Publication Data
US 2012/0265888 A1    Oct. 18, 2012

Related U.S. Application Data

(60) Provisional application No. 61/292,224, filed on Jan. 5, 2010.

(51) Int. Cl.
*H04W 76/02* (2009.01)
*H04W 24/00* (2009.01)
(Continued)

(52) U.S. Cl.
CPC ............... *H04W 24/00* (2013.01); *H04L 12/14* (2013.01); *H04L 12/1403* (2013.01);
(Continued)

(58) Field of Classification Search
CPC . H04L 12/14; H04L 12/1403; H04L 41/0893; H04L 41/5054; H04M 15/66; H04M 15/00; H04W 4/24; H04W 24/00; H04W 76/02; H04W 8/26
USPC .................................................. 709/227, 228
See application file for complete search history.

(56) References Cited

U.S. PATENT DOCUMENTS 8,326,263 B2 * 12/2012 Zhou et al. ................. 455/408
9,042,297 B2 *  5/2015 Muhanna ............. H04W 8/04
                                                      370/237

(Continued)

FOREIGN PATENT DOCUMENTS

| EP | 2 244 424 A1 | 10/2010 |
|---|---|---|
| WO | WO-2009-002841 A1 | 12/2008 |
| WO | WO-2009-091776 A1 | 7/2009 |
| WO | WO-2009-092319 A1 | 7/2009 |
| WO | WO-2009-100180 A2 | 8/2009 |

*Primary Examiner* — Kenneth R Coulter

(57) ABSTRACT

A method for deploying a policy from a 3GPP core network to a non-3GPP access network. The policy relates to a connection established from a mobile terminal to the 3GPP core network via the non-3GPP access network. A local IP address acquired by the mobile terminal during establishment of the connection is received at the 3GPP core network. At the 3GPP core network, establishment of a policy control session is initiated from the 3GPP core network to the non-3GPP access network. The received local IP address is used to determine the non-3GPP access network used for the connection with reference to shared IP addressing information. At the 3GPP core network, the policy is provided to the non-3GPP access network using the policy control session established as a result of the policy control session initiation step. The policy is for deployment in the non-3GPP access network in relation to the established connection.

18 Claims, 27 Drawing Sheets

(51) Int. Cl.
*H04L 12/14* (2006.01)
*H04L 12/24* (2006.01)
*H04M 15/00* (2006.01)
*H04W 4/24* (2009.01)
*H04W 8/26* (2009.01)

(52) U.S. Cl.
CPC ....... *H04L 41/0893* (2013.01); *H04L 41/5054* (2013.01); *H04M 15/00* (2013.01); *H04M 15/66* (2013.01); *H04W 4/24* (2013.01); *H04W 8/26* (2013.01); *H04W 76/02* (2013.01)

(56) References Cited

U.S. PATENT DOCUMENTS

| | | | |
|---|---|---|---|
| 2010/0284336 A1* | 11/2010 | Rui et al. | 370/328 |
| 2010/0291923 A1* | 11/2010 | Zhou et al. | 455/432.1 |
| 2011/0122824 A1* | 5/2011 | Muhanna | H04W 8/04 370/328 |
| 2015/0230151 A1* | 8/2015 | Muhanna | H04W 8/04 370/329 |

* cited by examiner

METHOD AND APPARATUS FOR GATEWAY SESSION ESTABLISHMENT

This application claims the benefit of U.S. Provisional Application No. 61/292,224, filed Jan. 10, 2012, the disclosure of which is fully incorporated herein by reference.

TECHNICAL FIELD

The present invention relates to a method and apparatus for gateway session establishment in a scheme for connecting a mobile terminal to a 3GPP core network via a non-3GPP access network. The method finds particular use in Fixed Mobile Convergence.

BACKGROUND

An ongoing trend within telecommunications is the convergence of fixed and mobile networks, which is known as Fixed Mobile Convergence (FMC). The trend of evolving networks using IP-based technologies is common for fixed and mobile networks, which makes the convergence easier. By FMC, mobile and fixed network operators will be able to utilize their network resource more efficiently, which leads to reduction of capital and operational expenditure (CAPEX and OPEX). For instance, when a user is running an IP-based application such as Multimedia Telephony (MMTel) inside their home, it is more efficient to utilize broadband connectivity of the fixed access network rather than the wireless access network.

Residential networks are a key to the success of FMC because they are the most commonly used fixed network access by ordinary users. Therefore, it is important to be able to connect mobile phones to the Evolved Packet Core (EPC; see "Architecture enhancements for non-3GPP Accesses," 3GPP TS 23.402, V8.2.0, 2008-06) through a residential network. Hereinafter the term User Equipment (UE) will be used in place of the term mobile terminal or mobile phone; the term UE is familiar in the 3rd Generation Partnership Project (3GPP) documentation.

3GPP defines mobile 2G/3G/LTE accesses and "non-3GPP accesses" (TS 23.402). The latter can be a fixed network. Many UEs address the FMC trend by providing multiple radio interfaces: one interface to connect to a 2G/3G/LTE access and a WiFi interface to connect to a fixed network.

TS 23.402 defines different ways for a UE to connect to the 3GPP core network (EPC) via a non-3GPP access network. These interfaces use either the Proxy Mobile IP (PMIP) or the Client Mobile IP (CMIP) mobility protocol. In this document, the use of CMIP is generally assumed; i.e. the interface known as S2c.

The present applicant has appreciated the following technical issues with the situation as presently specified.

For advanced use cases, e.g. making an IMS voice call, QoS setup is required both in the EPC and in the non-3GPP access. How to do this for S2c is defined in TS 23.402. Following those definitions implies that the border gateway (BGW) in the non-3GPP access domain is required to setup a gateway control session towards the policy server in the EPC (the Policy and Charging Rules Function or PCRF). This gateway session is then used to download QoS rules. Downloading of rules is done upon attach, but possibly also at a later stage—e.g. when a user initiates a new session towards an application. Since gateway control sessions are by definition established on a per-user basis, the BGW is required to have the identification of the UE. The only secure way to acquire this identification is by involving authentication. Therefore, the specifications define 3GPP access authentication (i.e. user authentication in the access).

3GPP access authentication is only defined on a high level. When applying 3GPP access authentication in specific cases, e.g. when the non-3GPP access network is a BBF network (BBF stands for Broad Band Forum, the standardization organization for the fixed access; see http://www.broadband-forum.org/), the specifications do not promote a specific authentication protocol. Several candidates have been investigated, but the usefulness of these candidates depends very much on the specific network topology. Examples are: does the user configure its own WiFi AP (access point), or is this remotely managed by the operator? Is the residential gateway (RGW) bridged or routed? Is there a Network Address Translation (NAT) in the RGW?

It is desirable to address the above issues identified by the applicant.

SUMMARY

A method is proposed here involving the connecting of a mobile terminal or UE to a 3GPP core network, such as the Evolved Packet Core, via a non-3GPP access network, such as a BBF network. The method finds use in a Fixed Mobile Convergence scheme, where the mobile terminal or UE connects to the 3GPP core network through a fixed residential network, for example using WiFi.

A method is particularly proposed here for establishing a gateway control session (or gateway session) between a BGW (or equivalent) in the non-3GPP access network and a PCRF (or equivalent) in the 3GPP core network. The gateway control session is established to provide a policy from the 3GPP core network to the non-3GPP access network relating to a connection established from a mobile terminal to the 3GPP core network via the non-3GPP access network. The gateway control session (or gateway session) may therefore be considered to be a policy control session, and may be referred to as such in place of gateway control session (or gateway session).

In the case where a BBF network is the non-3GPP access network, the BGW would be a BNG. The method achieves establishment of the gateway session without 3GPP access authentication. In the method, it is the PCRF that initiates establishment of the gateway session, rather than the BGW. In order that the PCRF can address the correct BGW in such a method, addressing information is shared between operators.

A scheme for establishment of the gateway session is proposed as comprising the following steps: (0) share IP addressing information; (1) local authentication of UE, with the UE acquiring a local IP address; (2) forward local IP address to PDN Gateway in the 3GPP core network; (3) forward local IP address to PCRF; (4) the PCRF initiates the gateway session towards the BGW, using the local IP address received in step 3 and the IP addressing information from step 0; (5) the gateway session is established.

In step 2 above, a tunnel (security association) is established between the UE and the PDN Gateway in the 3GPP core network, including user authentication. Step 2 can be considered to comprise the following stages: A) a security association is established; then B) a Mobile IP session is established; and finally C) a tunnel is established; stage B is important in this context since it carries the local IP address to the PDN GW. In step 3 above, an IP session is established between the PDN Gateway and the PCRF, using UE information received in step 2 (this is to enable downloading of packet filters from the PCRF to the PDN Gateway at a later stage). In step 4 above, the PCRF initiates the gateway session towards the BGW, using UE information received in step 3 and addressing information from step 0 (the purpose of this session is to enable downloading of packet filters from the PCRF to the BGW at a later stage). The PCRF does not generally address a specific BGW, but rather would address a Diameter realm and a DRA. The PCRF might initiate the gateway session towards the BGW using a Policy Control Function (PCF), or equivalently a Broadband Policy Control Function (BPCF), in a BBF network.

Regarding step 0 above, the proposal is that each non-3GPP access network knows which blocks or ranges of IP addresses that might be assigned to UEs/NATs. A number of ways of delivering this information to, or sharing this information with, the PCRF (for use in step 4 above) are possible. Three such ways of sharing IP address ranges are proposed here: (a) using DNS; (b) using DRA routing configuration; and (c) using a distributed mapping database. It is to be understood that the exact manner in which the IP addressing information is shared is not important, and the present invention is of course not limited to one of these three ways; another way of sharing may be used, and a combination of two or more of such ways is also possible With method (a) above, the IP address range is mapped to a network ID and added to the DNS server. The DRA in the non-3GPP access network updates its routing tables in order to be able to find the PCF serving a given UE/NAT IP address. To initiate the gateway session, the PCRF performs a reverse DNS lookup based on the UE/NAT address. The DNS replies with the network ID, and this is used to address the DRA in the non-3GPP access network (e.g. in the Destination-Realm AVP). The PCF is configured in order to be able to find the BGW serving a given UE/NAT IP address. This is the approach taken in the first embodiment described below.

With method (b) above, a message sent by the PCRF to the PCF to initiate a session contains a specially-formatted Destination-Realm AVP. The destination realm is constructed from the IP address of the UE/NAT in question similar to the fashion how DNS names are constructed from IP addresses for reverse DNS lookups. In order for this to work, the DRA in the 3GPP domain needs to be configured properly. This is done based on the routing information received from a configuration message from the non-3GPP domain. The DRA on the non-3GPP side updates its routing tables in order to be able find the PCF serving a given UE/NAT IP address. The PCF is configured in order to be able to find the BGW serving a given UE/NAT IP address. This is the approach taken in the second embodiment described below.

With method (c) above, rather than re-using an existing database structure, a separate database is introduced. Within the non-3GPP domain, there is a local mapping database listing which IP address ranges are served by which BGW and which BGW is served by which PCF. Using that local mapping database, the DRA can find out which PCF to address given a UE/NAT address. Similarly, the PCF can find out which BGW to address. Each non-3GPP operator informs all networks it has a roaming agreement with about the address blocks it uses to assign addresses to UEs/NATs. These blocks are stored in the PCRF in the 3GPP domain; i.e. the PCRF maintains a list of ranges mapped to non-3GPP network ID. Using the UE/NAT address, the PCRF queries this list in order to find the network id. Using the network ID, the correct non-3GPP network can be addressed. This is the approach taken in the third embodiment described below.

In the proposed scheme, at least the PCRF, BPCF and BGW are configured to perform new steps not disclosed in existing schemes, and are therefore novel in their own right. Other nodes described below may also be performing novel steps and will also therefore be novel in their own right.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

As mentioned elsewhere in this document, there are several ways to do 3GPP access authentication, depending on the network configuration. This impacts the UE, or the WiFi AP, or the RGW, or a combination of these. Impacts might take the form of configuration or introduction of new protocols. An embodiment of the present invention proposes PCRF-initiated gateway session establishment. This has the advantage of eliminating the need for 3GPP access authentication. As a result, QoS setup is achieved in the non-3GPP access without impacting the UE, the WiFi AP and/or the RGW.

A method is disclosed herein of deploying a policy from a 3GPP core network to a non-3GPP access network. The policy relates to a connection established from a mobile terminal to the 3GPP core network via the non-3GPP access network. A local IP address is received at the 3GPP core network, the local IP address having been acquired by the mobile terminal during establishment of the connection. At the 3GPP core network, establishment of a policy control session is initiated from the 3GPP core network to the non-3GPP access network. The received local IP address is used to determine or to enable determination of the non-3GPP access network used for the connection with reference to shared IP addressing information. The shared IP addressing information sets out different respective ranges of local IP addresses assigned to a plurality of such non-3GPP access networks. At the 3GPP core network, the policy is provided to the non-3GPP access network using the policy control session established as a result of the policy control session initiation step. The policy is for deployment in the non-3GPP access network in relation to the established connection.

These steps may be performed by a policy server in the 3GPP core network, such as a policy and charging rules function.

The shared IP addressing information may be stored in a DNS database or another database maintained in the 3GPP core network. Determination of the non-3GPP access network used for the connection may comprise performing a lookup operation in the database based on the local IP address. Or, such a determination may be enabled by providing the local IP address to another node to enable that node to perform such a lookup operation based on the local IP address.

The other database may be a DRA. The method may comprise providing the local IP address to the DRA to enable the DRA to determine the non-3GPP access network used for the connection.

The other database may be maintained in the policy server.

A method is disclosed herein of deploying a policy in a non-3GPP access network from a 3GPP core network. The policy relates to a connection established from a mobile terminal to the 3GPP core network via the non-3GPP access network. The method comprises, at the non-3GPP access network, assisting in the establishment of a policy control session to the non-3GPP access network from the 3GPP core network, establishment of the policy control session having been initiated by the 3GPP core network using a local IP address acquired by the mobile terminal during establishment of the connection, the local IP address being to determine or to enable determination of the non-3GPP access network used for the connection with reference to shared IP addressing information setting out different respective ranges of local IP addresses assigned to a plurality of such non-3GPP access networks. The policy is received at the non-3GPP access network using the policy control session established as a result of the assisting step. The received policy is deployed at the non-3GPP access network in relation to the established connection, or it is arranged at the non-3GPP access network for such deployment to be made.

These steps may be performed (i) by a gateway node, such as a border gateway node, in the non-3GPP access network; or (ii) by a policy server, such as a policy control function, in the non-3GPP access network; or as a cooperation between (i) and (ii).

The policy may be or may comprise a QoS policy.

The mobile terminal may comprise a UE.

The 3GPP core network may comprise an Evolved Packet Core network.

The non-3GPP access network may comprise a BBF network.

An apparatus is disclosed herein for use in a 3GPP core network. The apparatus is for deploying a policy from the 3GPP core network to a non-3GPP access network. The policy relates to a connection established from a mobile terminal to the 3GPP core network via the non-3GPP access network. A receiver or unit or other such means is provided for receiving a local IP address, the local IP address having being acquired by the mobile terminal during establishment of the connection. A processor or unit or other such means is provided for initiating establishment of a policy control session from the 3GPP core network to the non-3GPP access network, using the received local IP address to determine or to enable determination of the non-3GPP access network used for the connection with reference to shared IP addressing information. The shared IP addressing information sets out different respective ranges of local IP addresses assigned to a plurality of such non-3GPP access networks. A processor or unit or other such means is provided for providing the policy to the non-3GPP access network using the established policy control session. The policy is for deployment in the non-3GPP access network in relation to the established connection.

An apparatus is disclosed herein for use in a non-3GPP access network. The apparatus is for deploying a policy in the non-3GPP access network from a 3GPP core network. The policy relates to a connection established from a mobile terminal to the 3GPP core network via the non-3GPP access network. A processor or unit or other such means is provided for assisting in the establishment of a policy control session to the non-3GPP access network from the 3GPP core network, establishment of the policy control session having been initiated by the 3GPP core network using a local IP address acquired by the mobile terminal during establishment of the connection, the local IP address being to determine or to enable determination of the non-3GPP access network used for the connection with reference to shared IP addressing information setting out different respective ranges of local IP addresses assigned to a plurality of such non-3GPP access networks. A receiver or unit or other such means is provided for receiving the policy using the established policy control session. A processor or unit or other such means is provided for deploying or arranging for the deployment of the received policy in relation to the established connection.

DETAILED DESCRIPTION

In view of the above-mentioned technical problems associated with the prior art, an embodiment of the present invention proposes a way to set up gateway sessions without using 3GPP access authentication. The initiative to establish a gateway session does not come from the BGW (as currently defined for S2c), but from the PCRF. However, the implementation of such PCRF-initiated gateway session establishment introduces a subsidiary problem: how can the PCRF address the correct BGW? An embodiment of the present invention proposes to solve this by sharing addressing information between operators.

Before a detailed description of an embodiment of the present invention, a more detailed statement of the technical problem will be provided.

Figure 1:
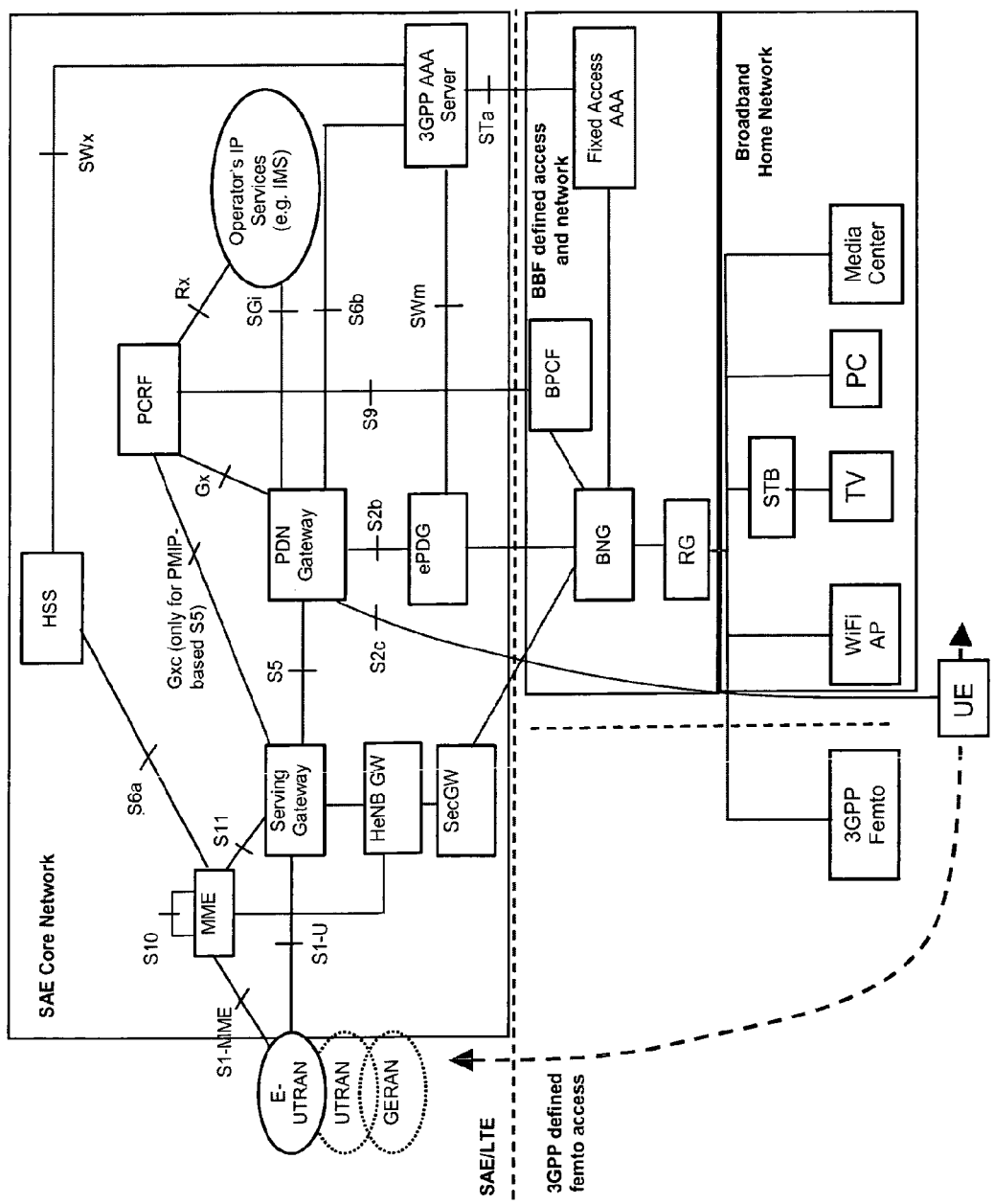
FIG. 1 is a schematic block diagram providing an architecture overview.

TS 23.402 defines how a UE attaches to a non-3GPP access using S2c. Assume a scenario where the non-3GPP access is a BBF network. FIG. 1 shows such a configuration. In the figures, RG stands for residential gateway, and is therefore equivalent to the RGW mentioned elsewhere herein.

Figure 2:
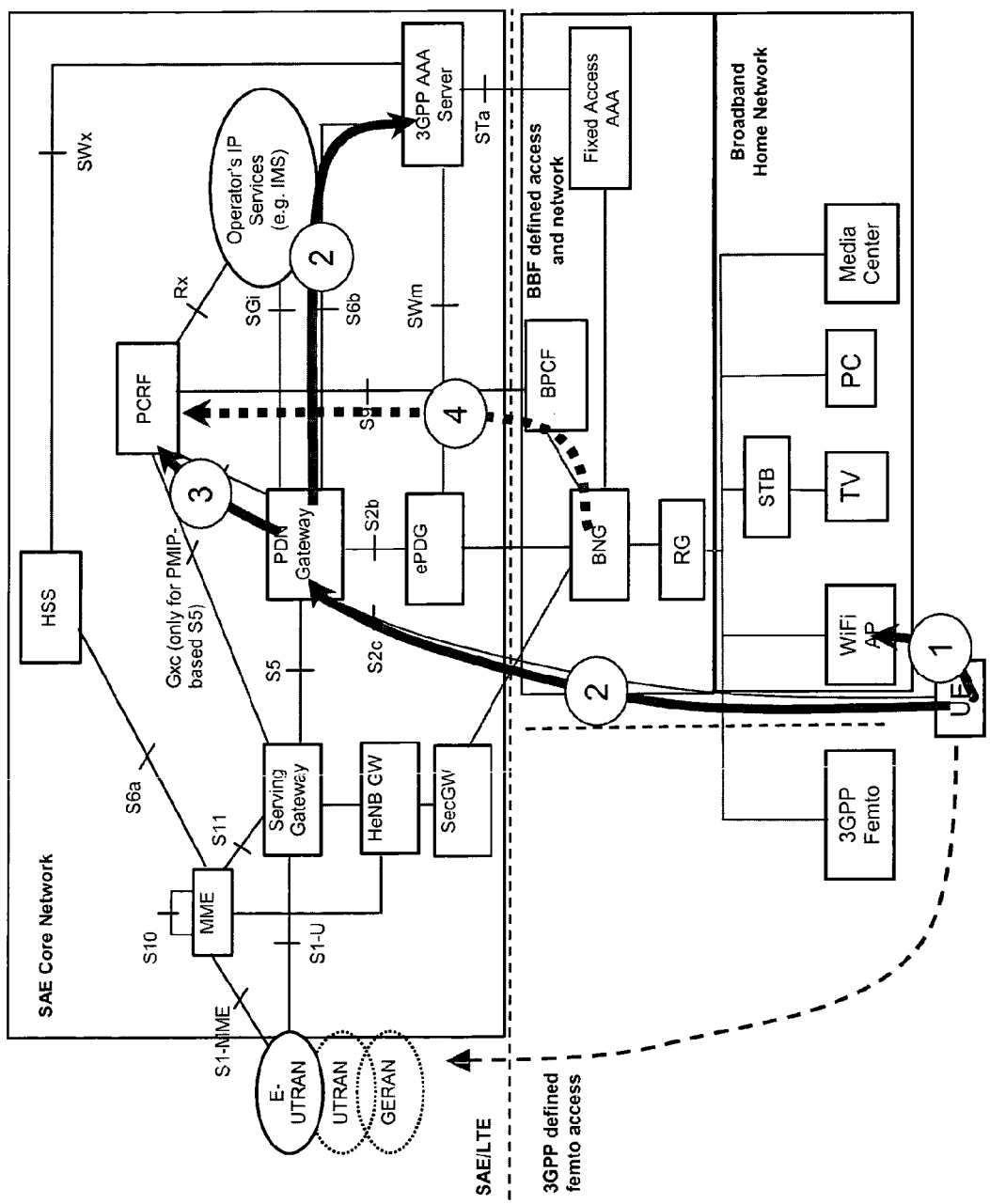
FIG. 2 is a schematic block diagram with steps illustrating a problem with the known procedures for attaching to an access in a case where 3GPP access authentication is not used.

First consider a scenario without 3GPP access authentication, which is illustrated in FIG. 2. In such a scenario, the BGW (called BNG here) cannot establish a gateway session towards the PCRF. The following steps are depicted in FIG. 2:

Step 1: Local authentication. UE acquires a local IP address. No 3GPP UE credentials involved. Same procedure as e.g. a laptop with a commodity OS.

Step 2: Setup of DSMIPv6 (Dual-Stack MIPv6) tunnel. Includes 3GPP user authentication. After step 2, user can do best-effort traffic. More steps are required to setup QoS.

Step 3: Internet Protocol Connectivity Access Network (IP-CAN) session setup. Based on 3GPP UE credentials received in step 2. The purpose of this session is to enable downloading of packet filters from PCRF to Packet Data Network Gateway (PDN-GW) at a later stage.

Step 4: BNG needs to initiate a gateway session. Based on 3GPP UE credentials. The purpose of this session is to enable downloading of packet filters from PCRF to BNG at a later stage.

However, the BNG does not have the 3GPP UE credentials required to setup a gateway session. As a result, no QoS in the BBF domain for that UE is set up.

Figure 3:
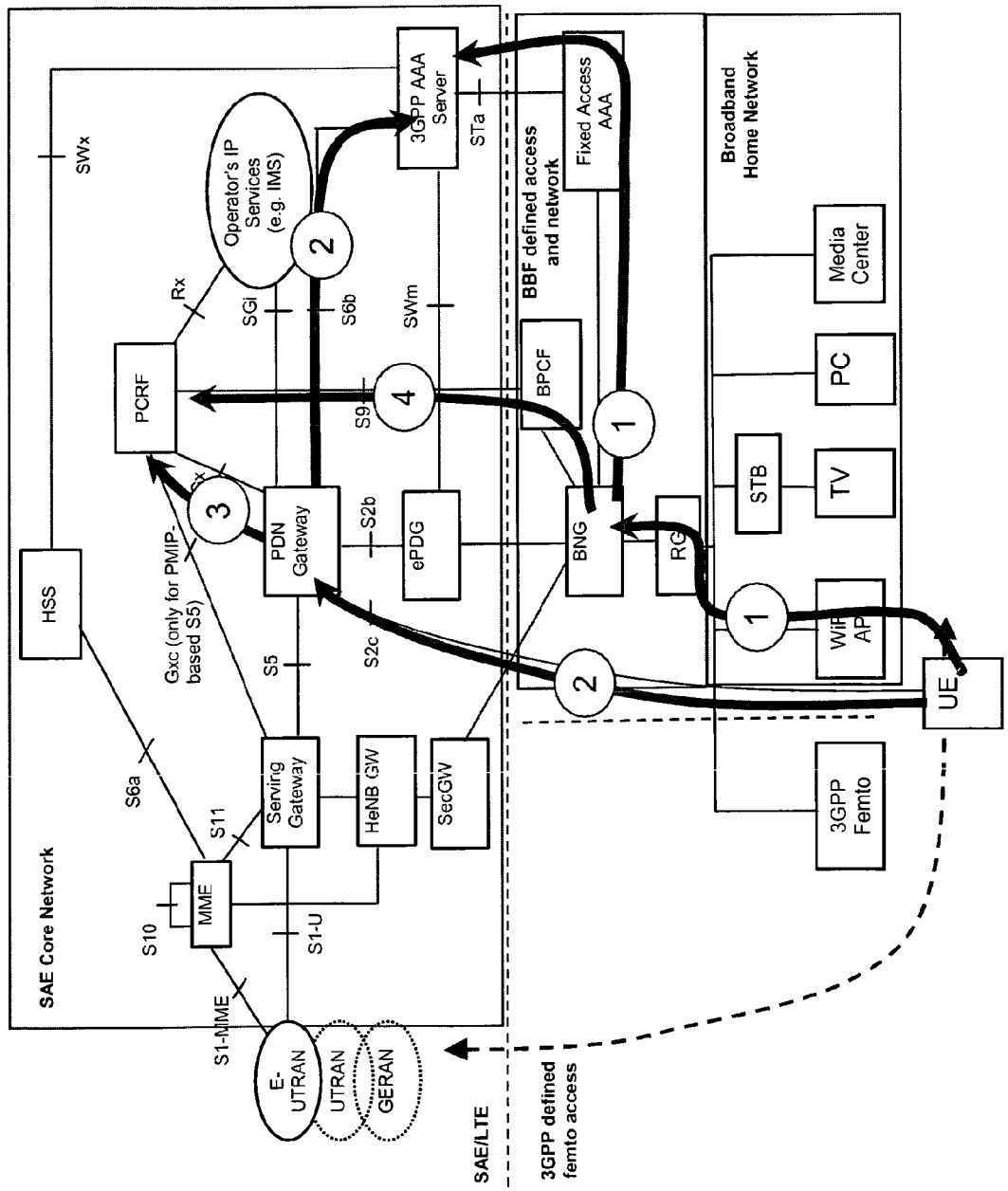
FIG. 3 is a schematic block diagram with steps illustrating the use of 3GPP access authentication for attaching to an access.

Now consider a scenario with 3GPP access authentication, which is illustrated in FIG. 3. By using 3GPP access authentication, the BNG is able to acquire the UE credentials. Using those, it can setup a gateway session. The following steps are depicted in FIG. 3:

Step 1: UE does a 3GPP access authentication. 3GPP UE credentials are now involved. This step is in line with the non-3GPP access approach. 3GPP access authentication is optional for S2c in TS 23.402.

Step 2, 3: As described above with reference to FIG. 2.

Step 4: BNG initiates the gateway session. Based on 3GPP UE credentials received in step 1. The purpose of this session is to enable downloading of packet filters from PCRF to BNG at a later stage.

Figure 4A:
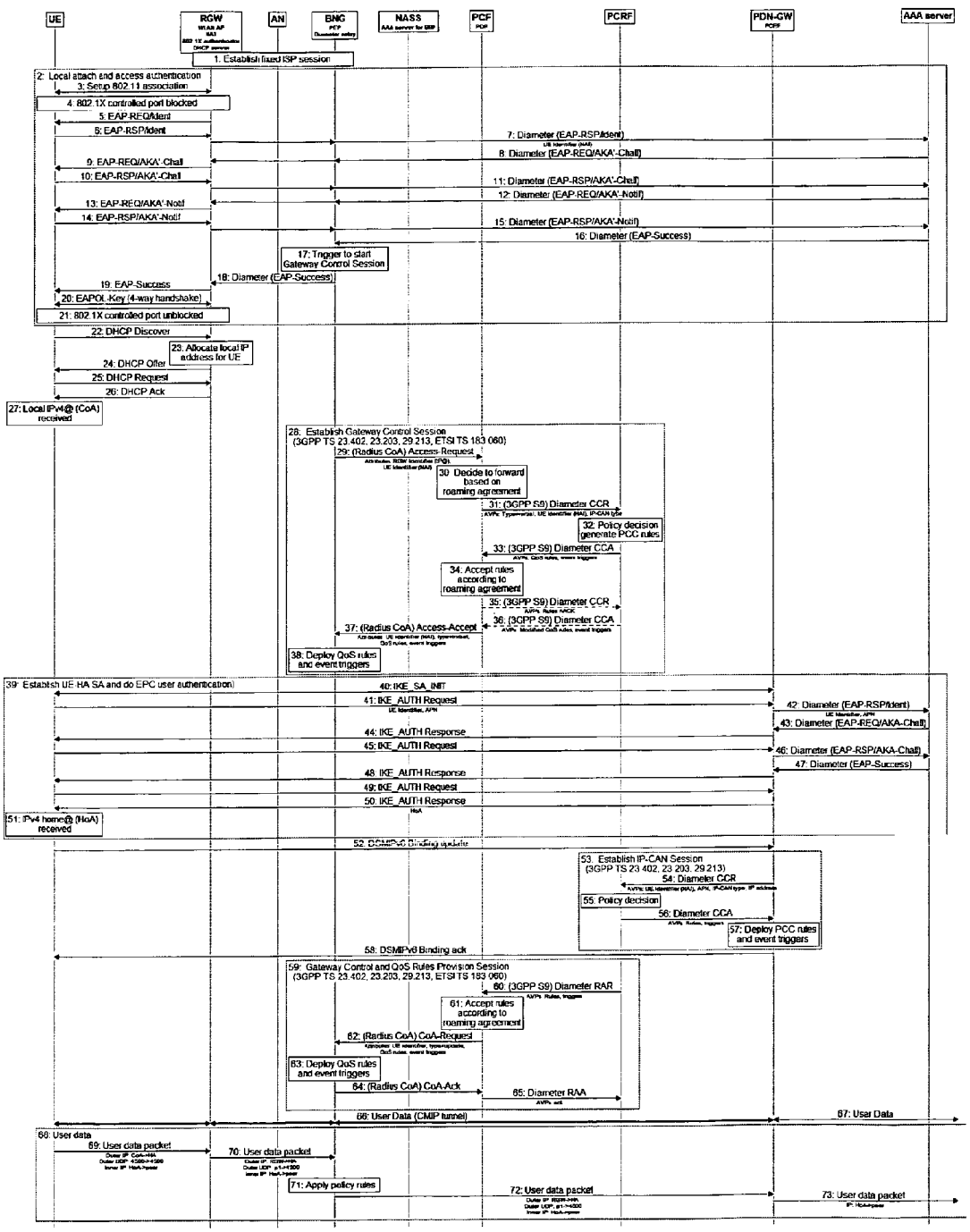
FIG. 4A can be considered to be pictorial rather than textual)
Figure 4B:
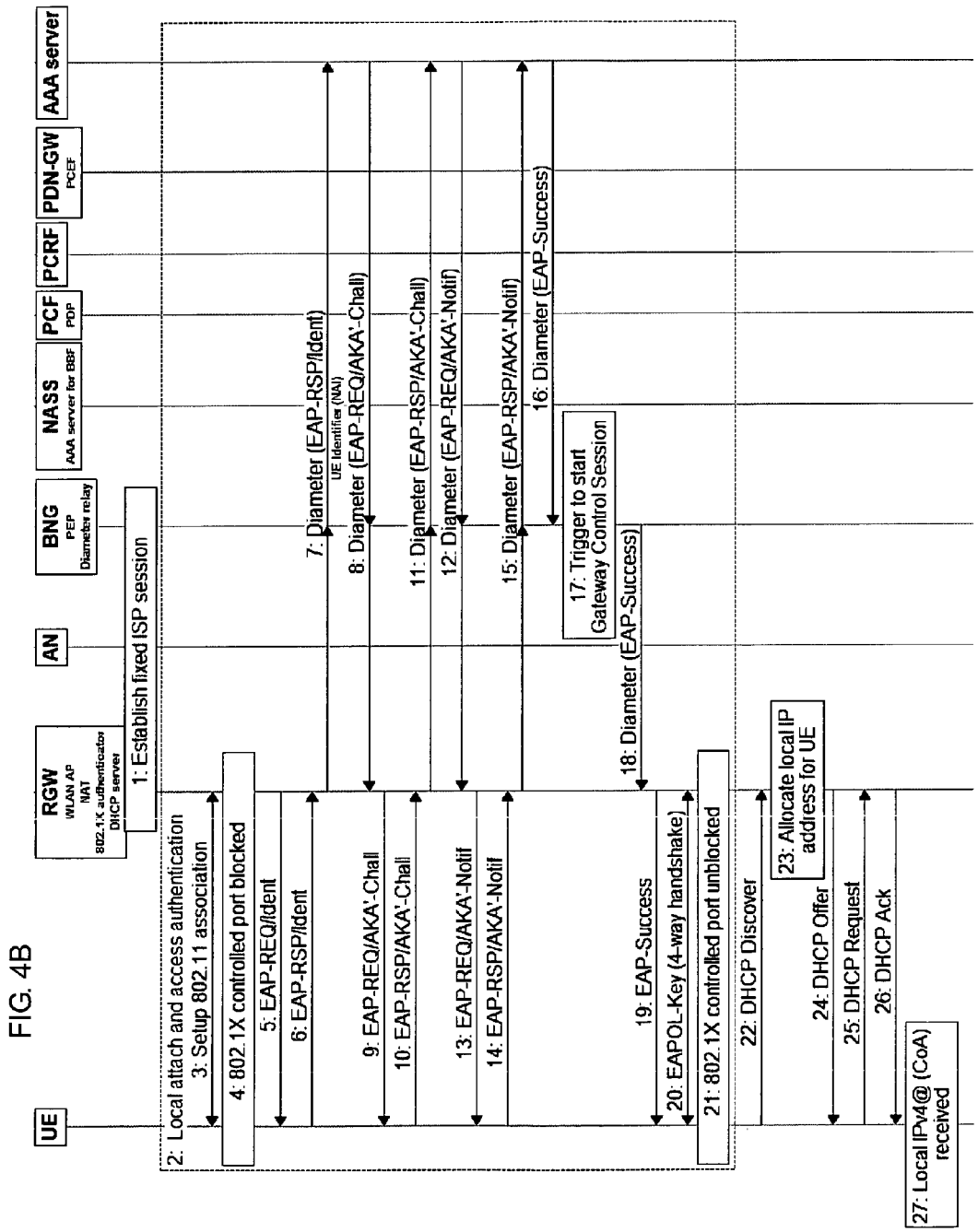
FIG. 4 is a signaling diagram for attaching to a non-3GPP (BBF) access network including 3GPP access authentication (FIG. 4A shows the entire signaling diagram while FIGS. 4B to 4E show the signaling diagram divided into four respective parts for clarity It is not important if the detail in FIG. 4A is not legible, since the content of FIG. 4A is replicated in FIGS. 4B to 4E.
Figure 4C:
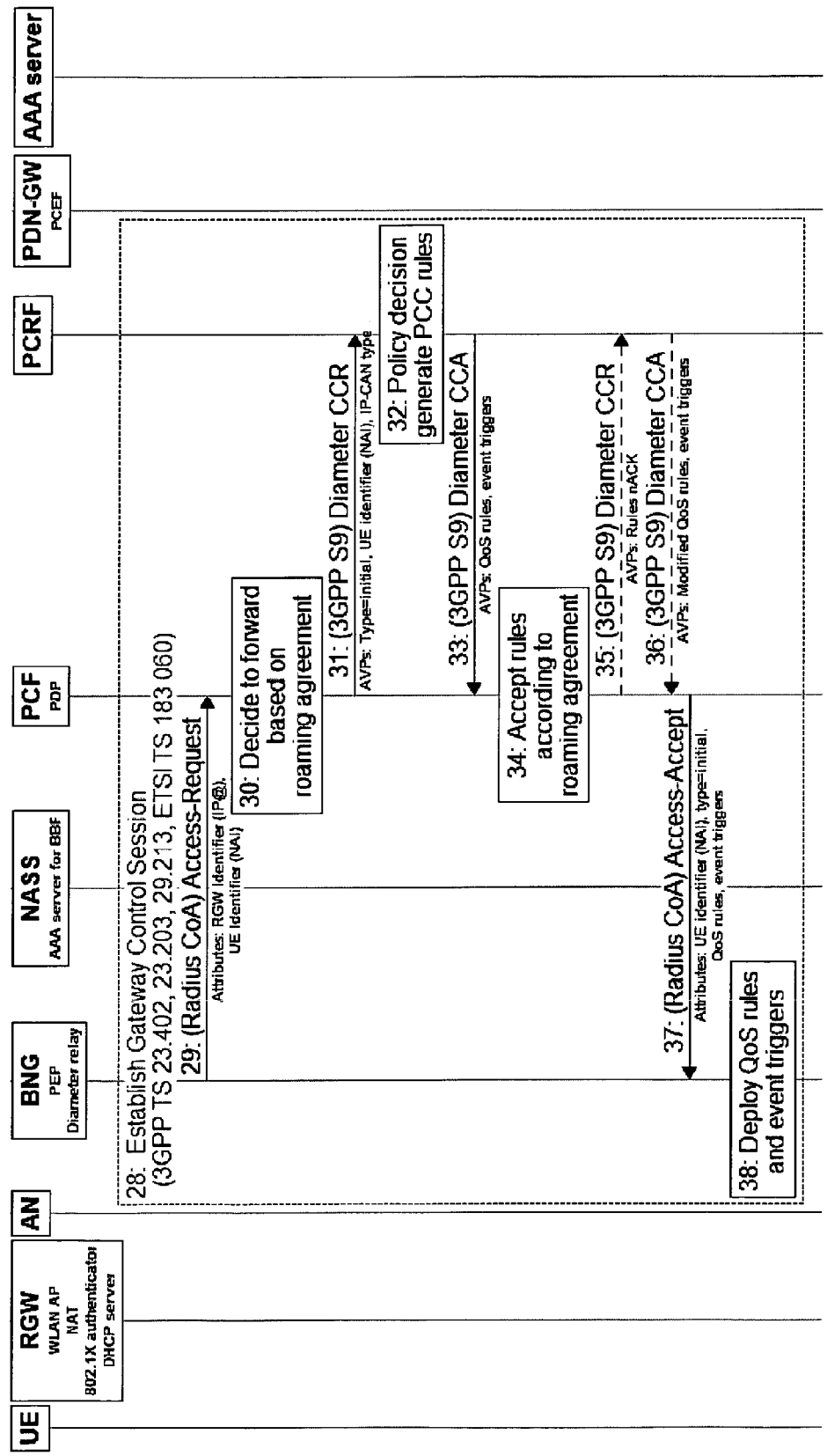
Figure 4D:
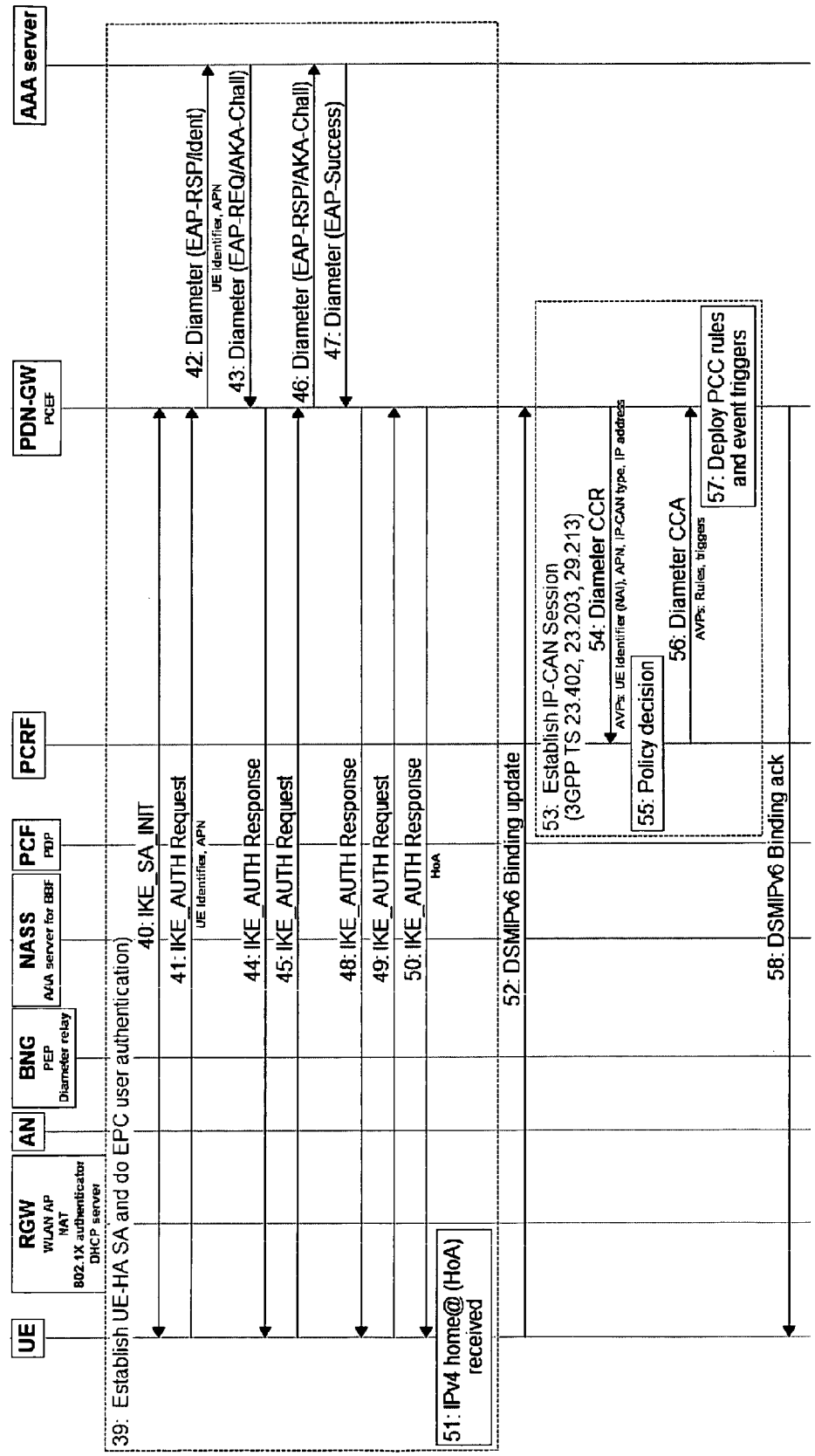
Figure 4E:
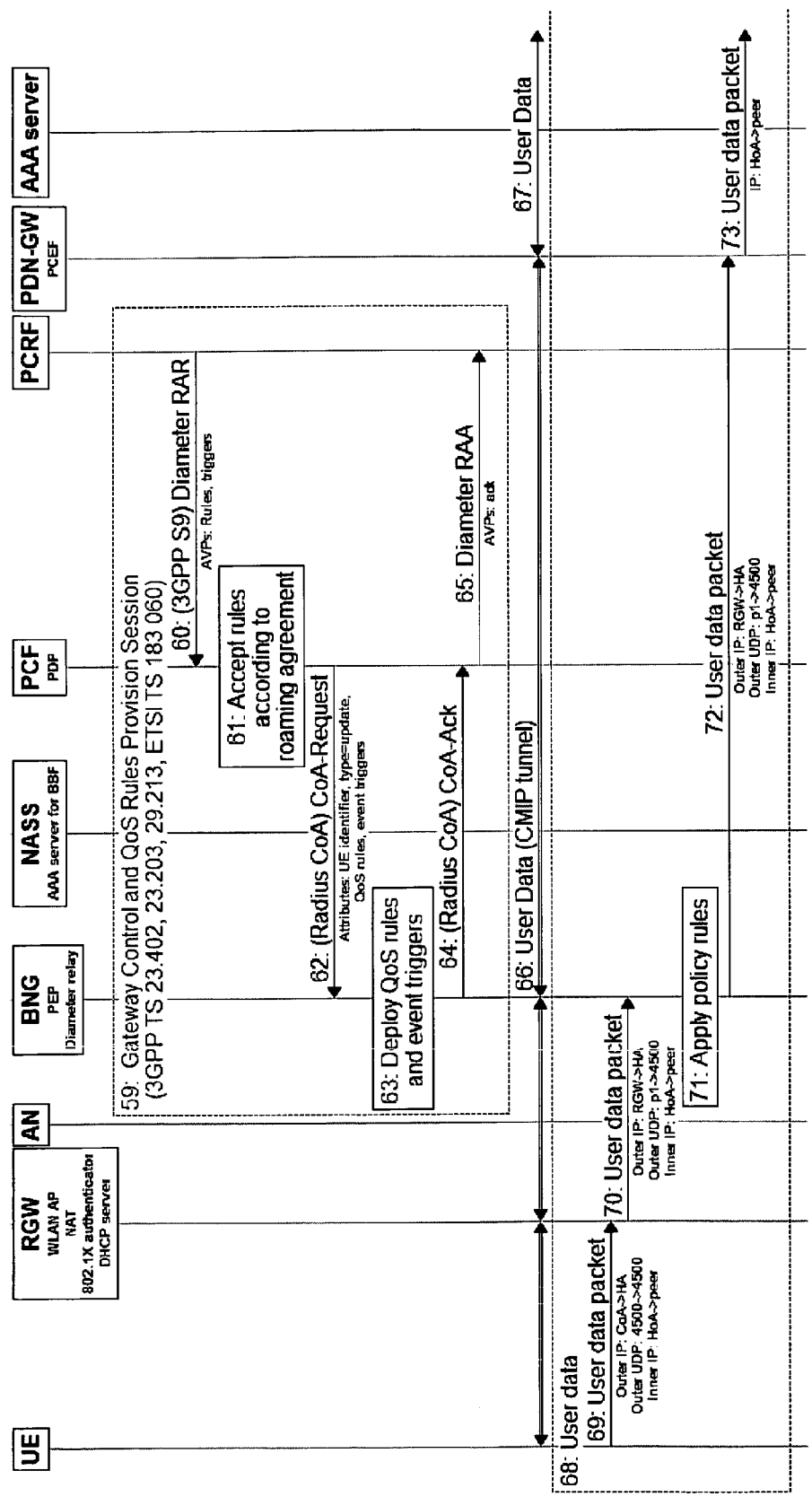

The signaling diagram of FIG. 4 explains in detail how the UE would attach to such a network using 3GPP access authentication (FIG. 4A shows the entire signaling diagram, while FIGS. 4B to 4E show the same signaling diagram divided into four parts for clarity). Note that RGW and WiFi AP are combined in the diagram of FIG. 4. Also, a NAT is assumed.

In the signaling diagram of FIG. 4, the BNG acts as a Diameter relay. That way it can spoof Diameter signaling. An alternative solution would be to send Diameter signaling from RGW directly to the AAA server. The AAA server could then signal the BNG to initiate the gateway session.

In the signaling diagram of FIG. 4, 802.1X is used as the authentication protocol. This implies, amongst others, that the WiFi AP (i.e. the 802.1X authenticator) needs to be configured properly: it needs to know the IP address of the AAA server and it needs to have a Radius/Diameter shared secret with that server. This is probably feasible if the WiFi AP is owned and managed by the operator. However, in most cases the WiFi AP is owned and managed by the user. So, this solution causes a deployment problem.

Another authentication protocol candidate is Dynamic Host Configuration Protocol (DHCP) Authentication. However, this protocol is mainly written for authentication of the RGW towards the fixed access. Updates to the protocol are required to make it more generic, such that even UEs can use DHCP Authentication. In an IPv6 scenario, DHCP is not required to acquire an IP address. As a result, it is a disadvantage to use DHCP Authentication in IPv6.

Yet another candidate is the Protocol for carrying Authentication for Network Access (PANA). For that protocol to work properly in the scenario above, the RGW needs to be bridged. In most cases today, the RGW is NATed. This limits the usefulness of PANA in a scenario relating to an embodiment of the present invention.

Implementing any of the protocols above in a scenario relating to an embodiment of the present invention is not trivial. It will put requirements on UE, WiFi AP and/or RGW regarding protocol and/or configuration. Therefore, an embodiment of the present invention proposes a way to initiate a gateway session establishment without 3GPP access authentication.

With the above more involved statement of the problem, an embodiment of the present invention can now be described in more detail.

Figure 5:
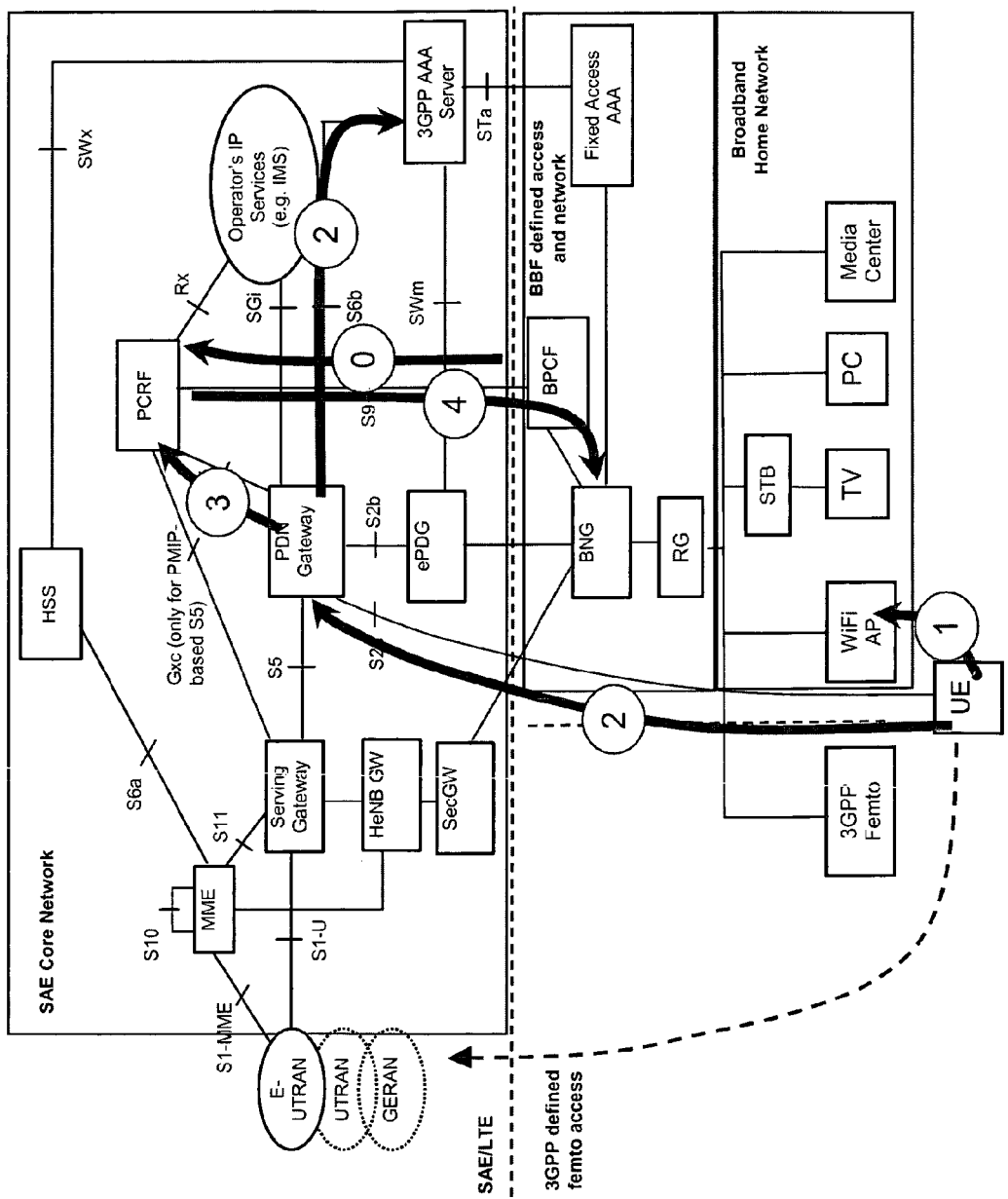
FIG. 5 is a schematic block diagram with steps illustrating PCRF-initiated gateway session establishment.

The schematic diagram shown in FIG. 5 defines how the PCRF could initiate the gateway session establishment in an embodiment of the present invention.

Step 0: to be described below.

Step 1: Local authentication. UE acquires a local IP address. No 3GPP UE credentials involved. Same procedure as e.g. a laptop with a commodity OS. (This is as step 1 of FIG. 2.)

Step 2: Setup of DSMIPv6 (Dual-Stack MIPv6) tunnel. Includes 3GPP user authentication. After step 2, user can do best-effort traffic. More steps are required to setup QoS. (This is as step 2 of FIG. 2.)

Step 3: Internet Protocol Connectivity Access Network (IP-CAN) session setup. Based on 3GPP UE credentials received in step 2. The purpose of this session is to enable downloading of packet filters from PCRF to Packet Data Network Gateway (PDN-GW) at a later stage. (This is as step 3 of FIG. 2.)

Step 4: PCRF initiates the gateway session towards BNG. (This is essentially the reverse of step 4 of FIG. 2.) The purpose of this session is to enable downloading of packet filters from PCRF to BNG at a later stage.

Note that the S9 interface between the PCRF and the BPCF (Broadband Policy Control Function) is a roaming interface. The BBF domain and the EPC domain might be two different operators. Since the UE is mobile, it could attach to any network its home operator has a roaming agreement with. (The interface between the 3GPP domain and the BBF domain is called S9, which is defined between the PCRF and the BPCF. It is possible to establish a session directly between PCRF and BGW, but then the interface is called Gxx, S9 being a superset of Gxx.)

If the BNG establishes a gateway session towards the PCRF, it does this based on UE credentials. This is the IMSI, which includes the codes (i.e. MNC and MCC) of the home network. Therefore, the BNG will always be able to address the correct PCRF.

This is not the case when the PCRF establishes the session. The only hint on the position of the UE/NAT is its local IP address: The PGW receives that address in step 2, and forwards it to the PCRF in step 3. Still, without additional knowledge, the PCRF cannot know which network to address.

The proposal as to how to solve this is based on the sharing IP address ranges. The basic idea is that each BBF operator knows which blocks of IP addresses that might be assigned to UEs/NATs.

In the following description, various different embodiments of the present invention are described, with alternatives as to how this information is delivered to the PCRF. The delivery of this information to the PCRF is depicted as step 0 in FIG. 5.

Note that in step 4 of FIG. 5, the PCRF does not address a specific BNG or BPCF. It addresses a Diameter realm and a DRA (not shown), similar to the addressing procedure within the EPC (TS 29.213). The only issue remaining is then how the PCRF addresses the BPCF, for which various solutions are presented below. It will be appreciated that these solutions are not exhaustive, and the skilled person will readily be able to devise other solutions based on the same principles.

Figure 6A:
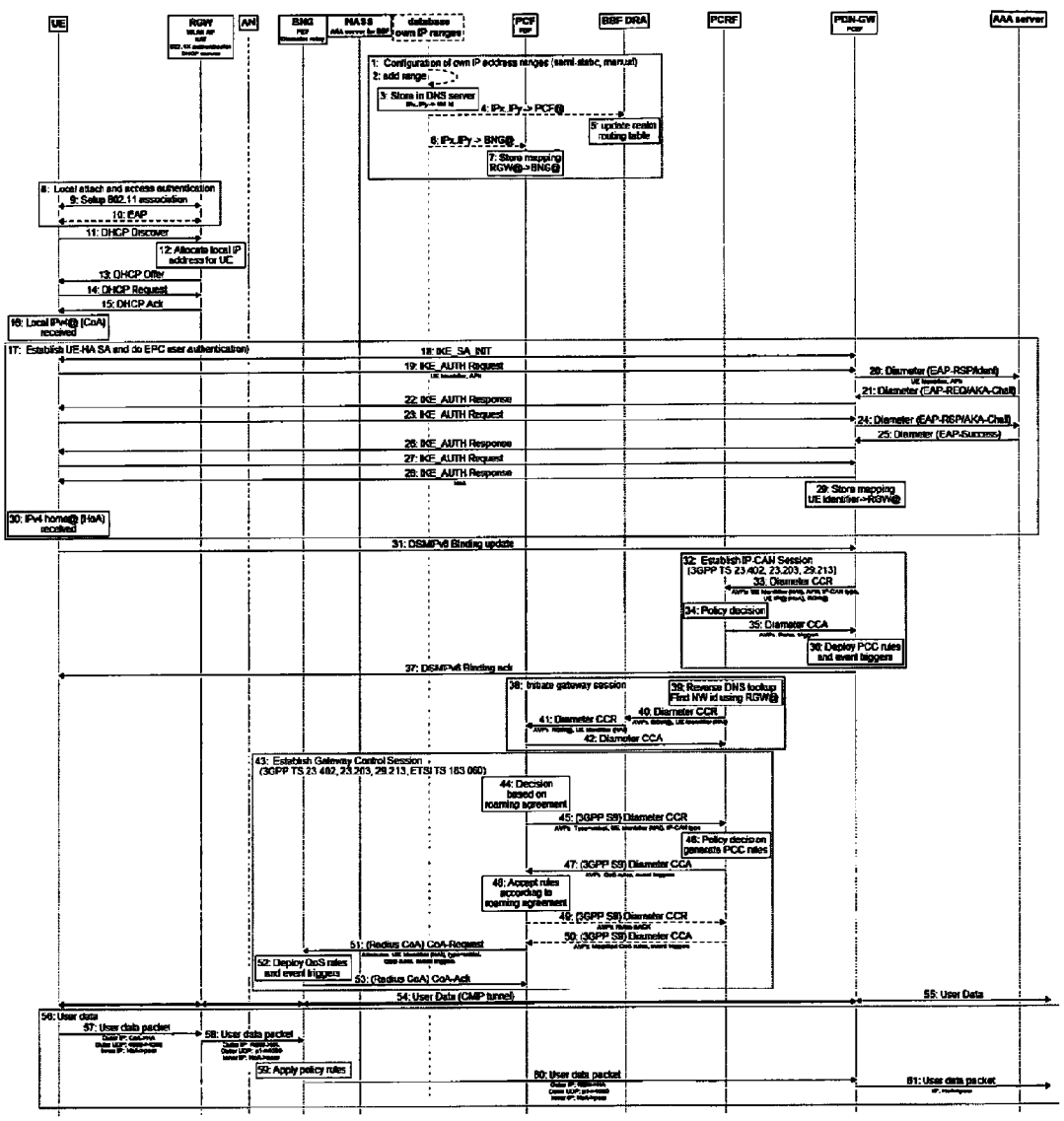
FIG. 6 is a signaling diagram for sharing of IP address ranges based on DNS (FIG. 6A shows the entire signaling diagram while FIGS. 6B to 6E show the signaling diagram divided into four respective parts for clarity It is not important if the detail in FIG. 6A is not legible, since the content of FIG. 6A is replicated in FIGS. 6B to 6E FIG. 6A can be considered to be pictorial rather than textual)
Figure 6B:
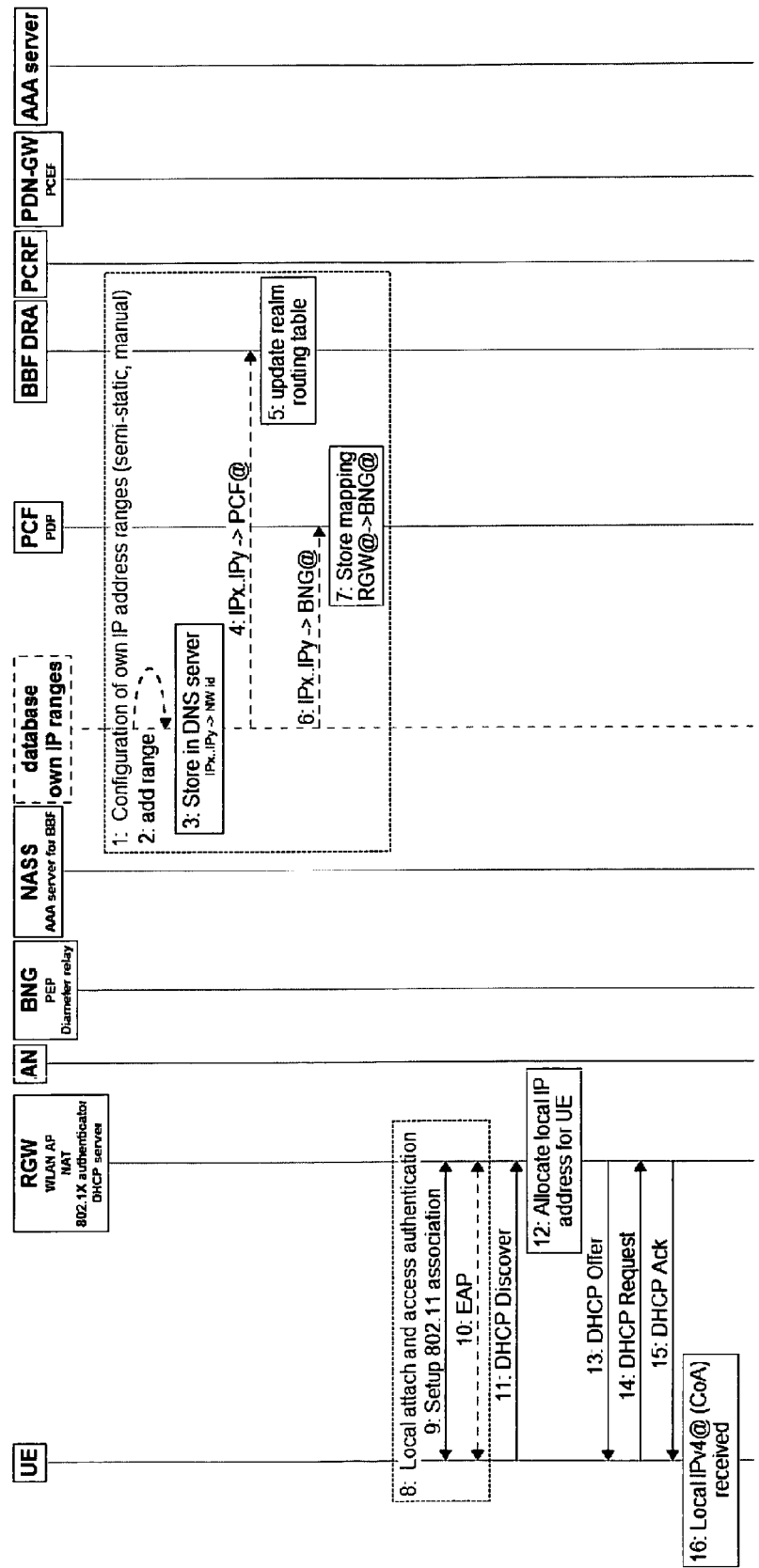
Figure 6C:
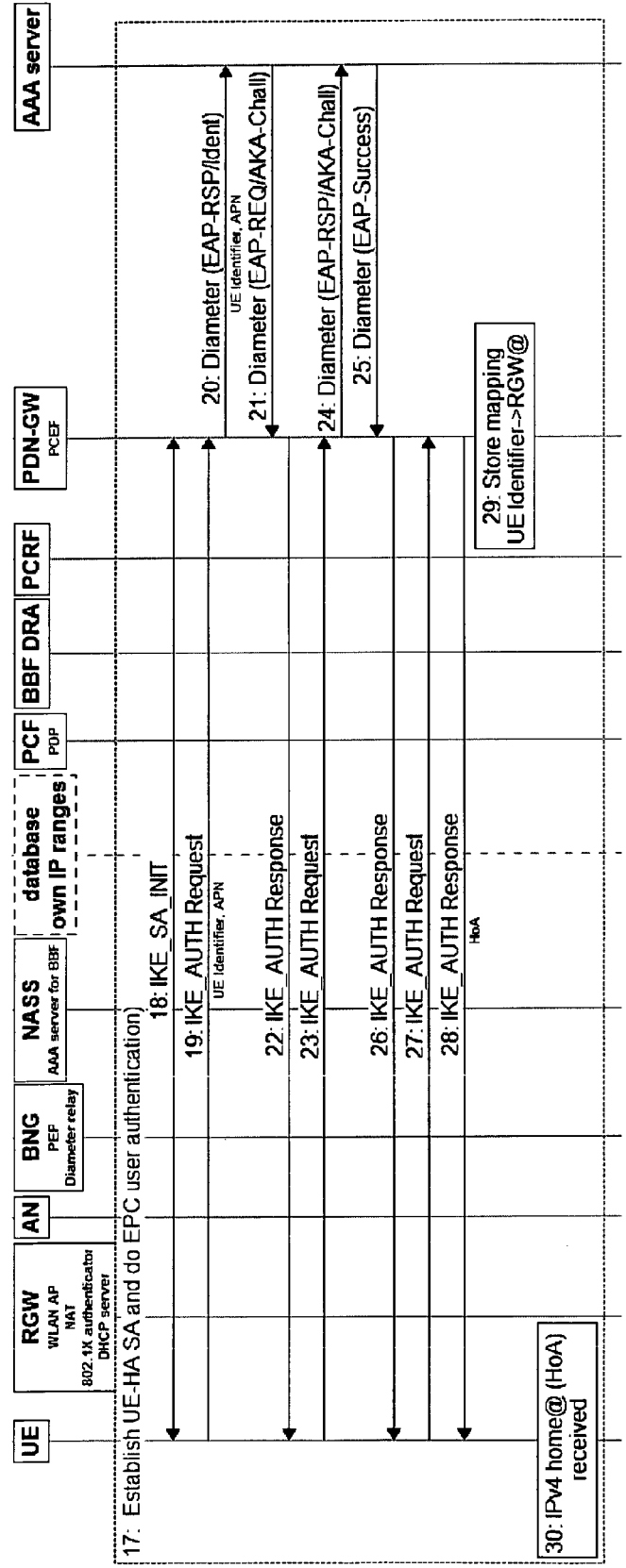
Figure 6D:
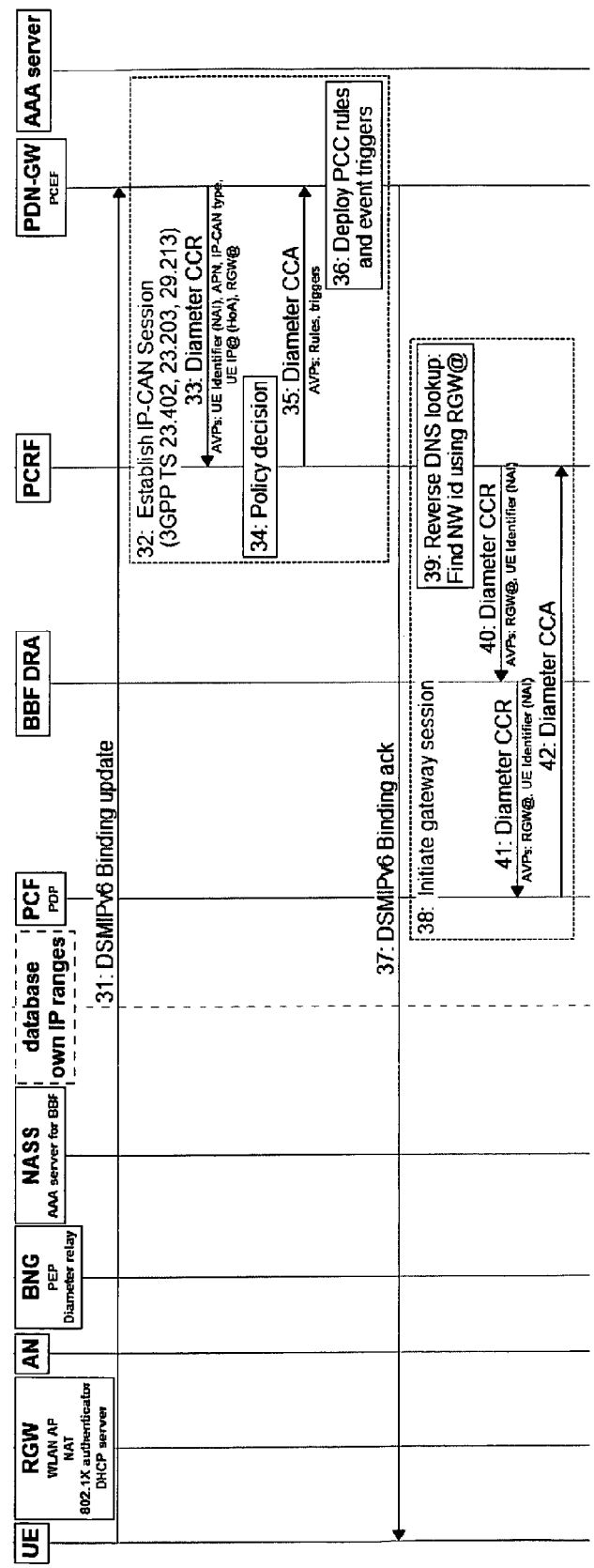
Figure 6E:
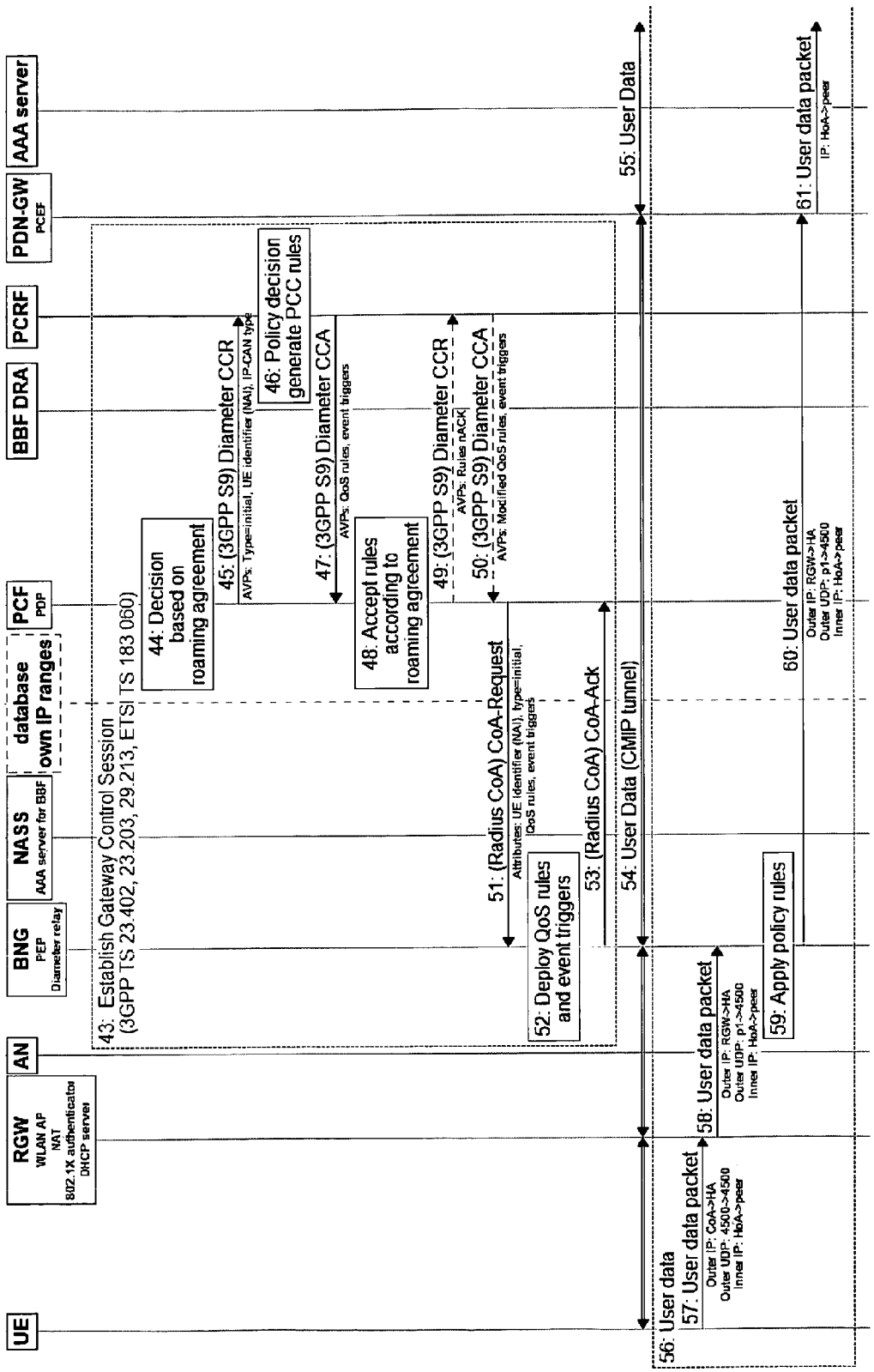

The first embodiment presents a solution in which the sharing of IP address ranges is based on DNS. The signaling diagram of FIG. 6 shows in detail one way of implementing a scheme according to the first embodiment (FIG. 6A shows the entire signaling diagram, while FIGS. 6B to 6E show the same signaling diagram divided into four parts for clarity).

In the BBF domain, the IP address range mapped to the network ID is added to the DNS server. The network ID is a domain name in the form of "ims.mnc<MNC>.mcc<MCC>.3gppnetwork.org" (as defined in the 3GPP specifications).

The DRA on the BBF side updates its routing tables in order to be able find the BPCF serving a given UE/NAT IP address. The BPCF is configured in order to be able to find the BNG serving a given UE/NAT IP address.

Note that the EPC domain might contain multiple PCRFs. In that case, a Diameter Routing Agent (DRA) is used as defined in TS 29.213. This is not shown in FIG. 6. FIG. 6 only shows the DRA on the BBF side.

To initiate the gateway session, the PCRF starts with a reverse DNS lookup based on the UE/NAT address. The DNS will reply with the network ID. This is used in the Destination-Realm AVP to address the DRA in the BBF domain.

The block called "configuration of own IP address ranges" serves as an illustration. It is not in detail specified here how this block shall be implemented. This can be manually set up or partly automated.

Figure 7A:
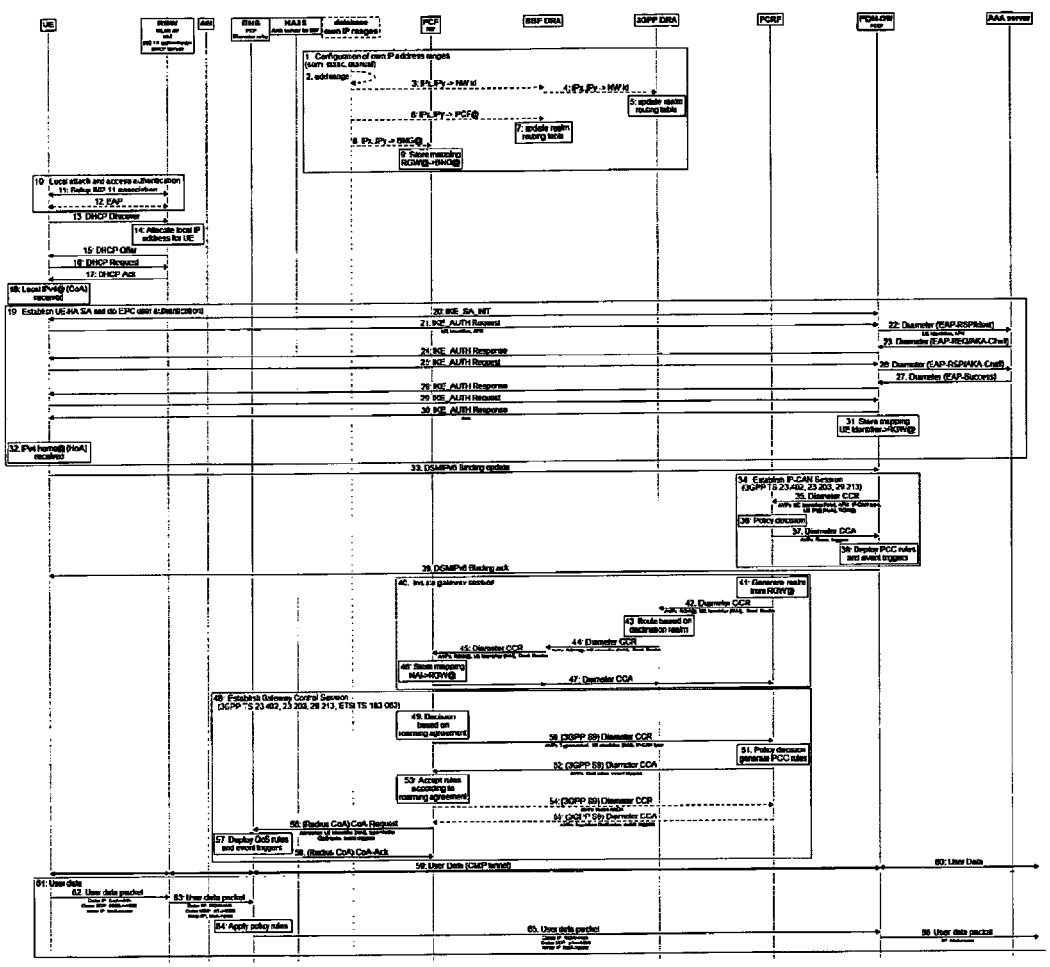
FIG. 7A can be considered to be pictorial rather than textual)
Figure 7B:
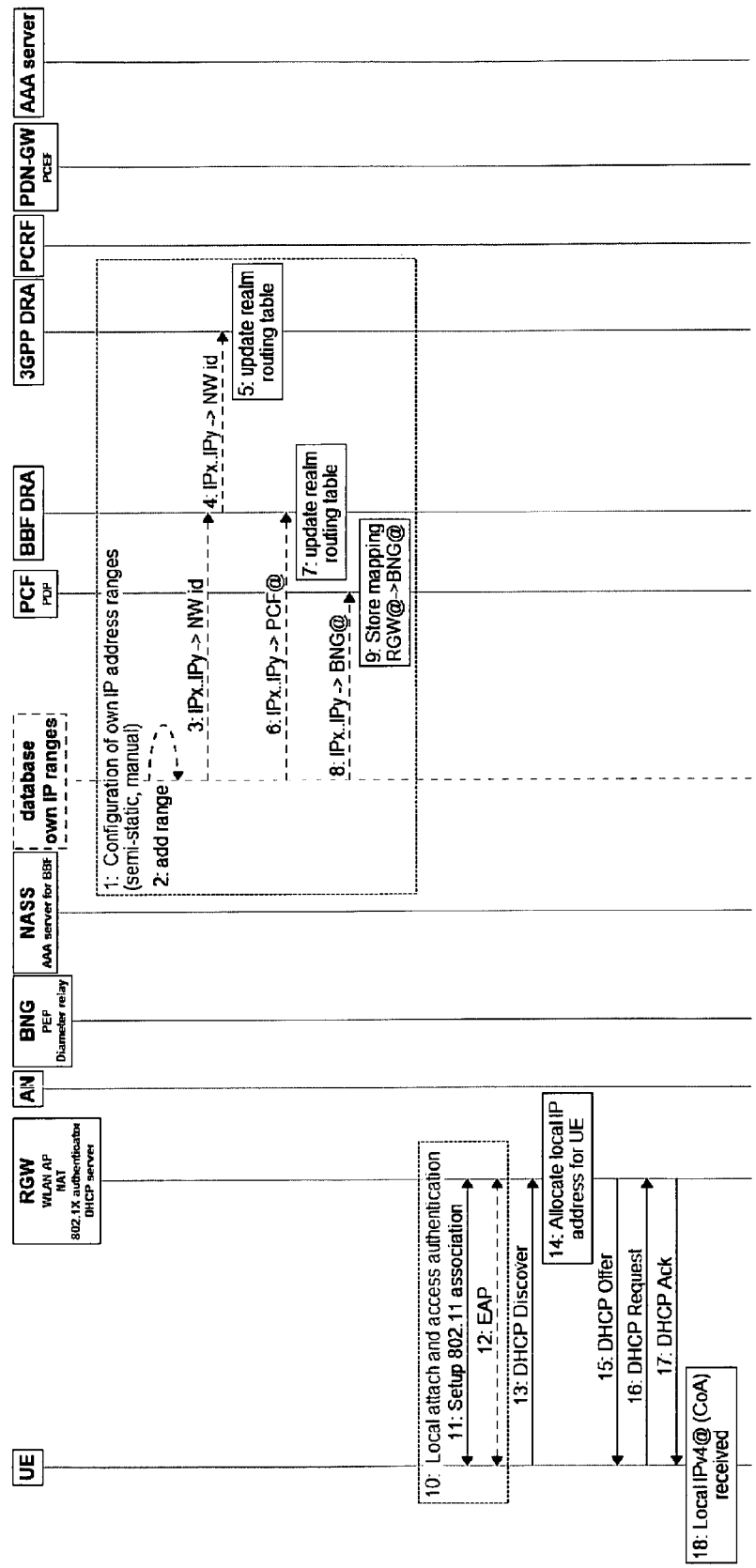
FIG. 7 is a signaling diagram for sharing of IP address ranges based on DRA routing configuration (FIG. 7A shows the entire signaling diagram while FIGS. 7B to 7E show the signaling diagram divided into four respective parts for clarity. It is not important if the detail in FIG. 7A is not legible, since the content of FIG. 7A is replicated in FIGS. 7B to 7E.
Figure 7C:
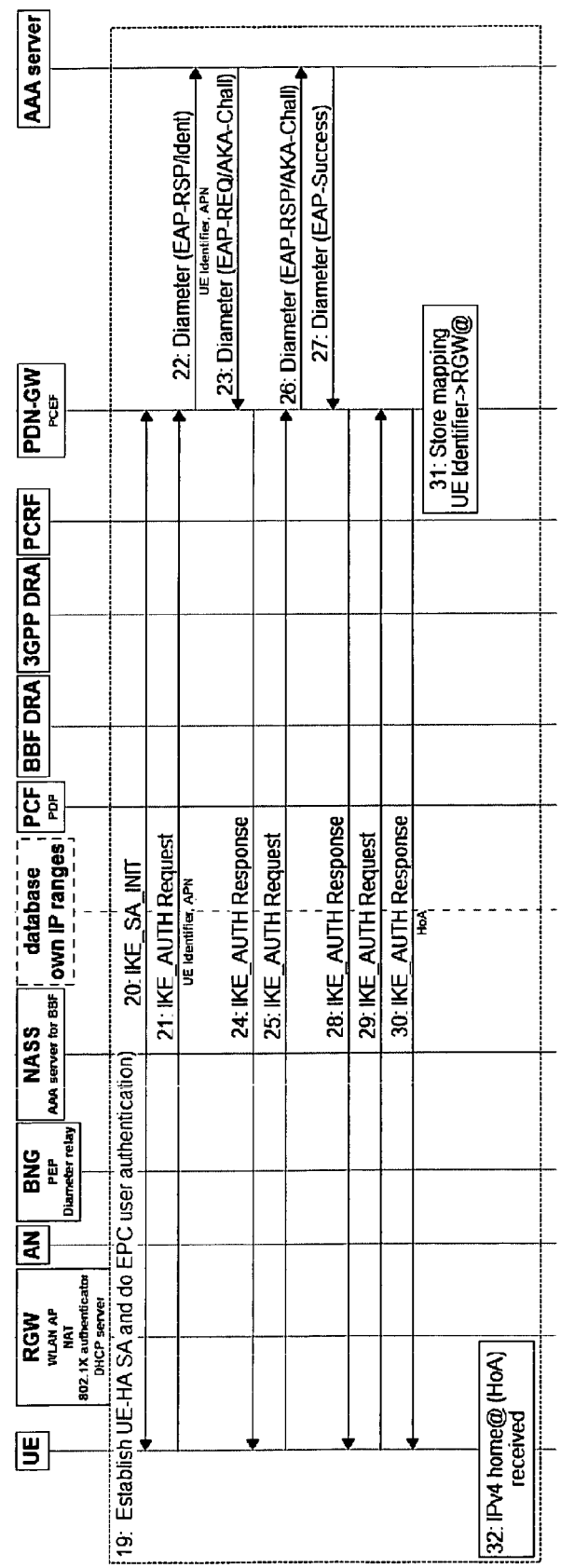
Figure 7D:
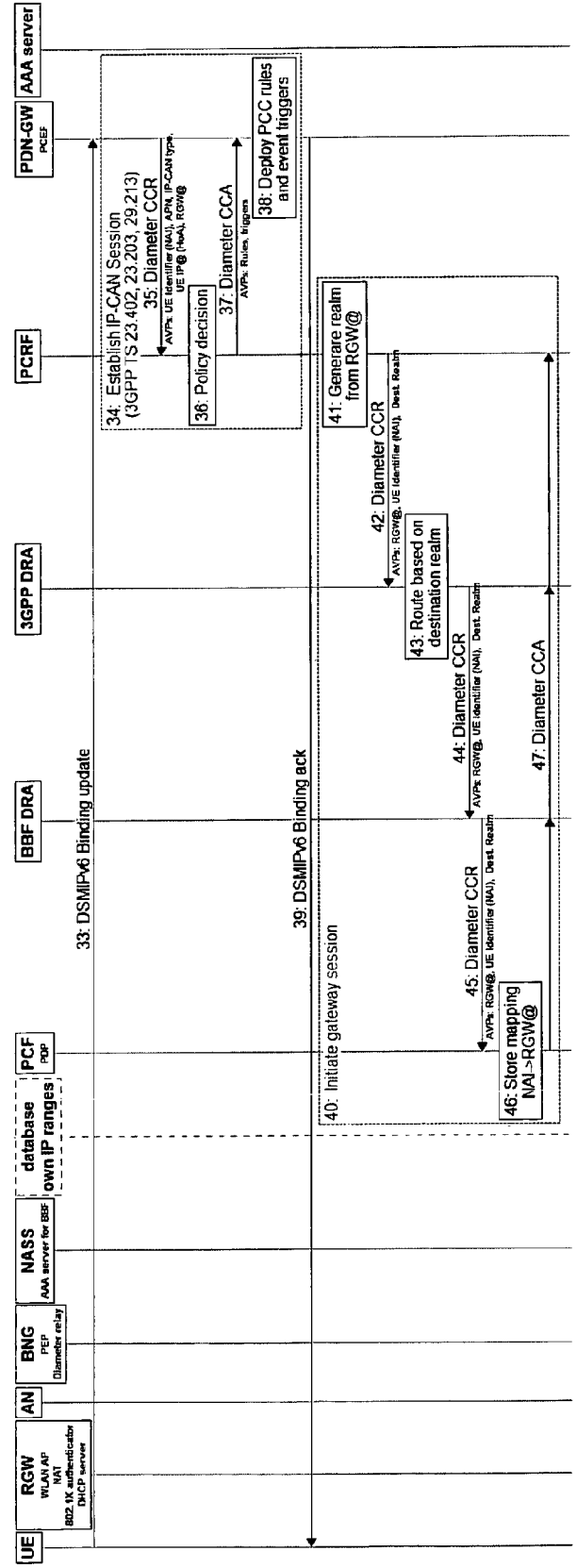
Figure 7E:
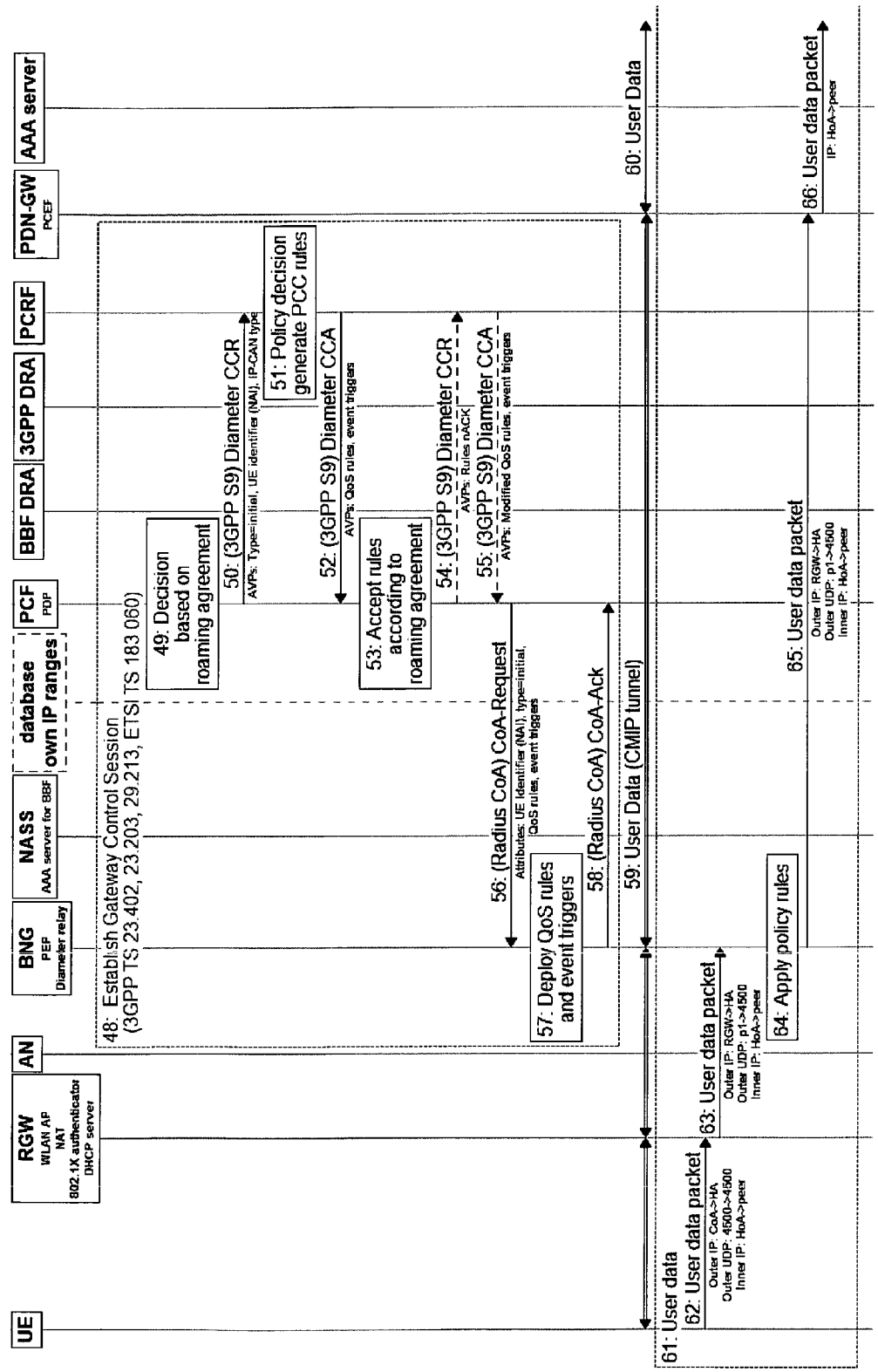

The second embodiment presents a solution in which the sharing of IP address ranges is based on DRA routing configuration. The signaling diagram of FIG. 7 shows in detail one way of implementing a scheme according to the second embodiment (FIG. 7A shows the entire signaling diagram, while FIGS. 7B to 7E show the same signaling diagram divided into four parts for clarity).

In the second embodiment as shown in FIG. 7, a message sent by the PCRF to the BPCF to initiate a session contains a specially formatted Destination-Realm AVP. The destination realm is constructed from the IP address of the UE/NAT in question similar to the fashion how DNS names are constructed from IP addresses for reverse DNS lookups (see section 2.5 in RFC 3596 or RFC 2317).

In order for this to work, the DRA in the 3GPP domain needs to be configured properly. This is done based on the routing information received from a configuration message from the BBF domain (signal 4 in FIG. 7). The DRA on the BBF side updates its routing tables in order to be able find the BPCF serving a given UE/NAT IP address. The BPCF is configured in order to be able to find the BNG serving a given UE/NAT IP address.

The block called "configuration of own IP address ranges" serves as an illustration. It is not in detail specified here how this block shall be implemented. This can be manually set up or partly automated.

The third embodiment presents a solution in which the sharing of IP address ranges is based on a distributed mapping database. The first and second embodiments described above attempt to re-use existing database structure; if that is for some reason not desirable, a new database can be introduced as in the third embodiment.

Figure 8A:
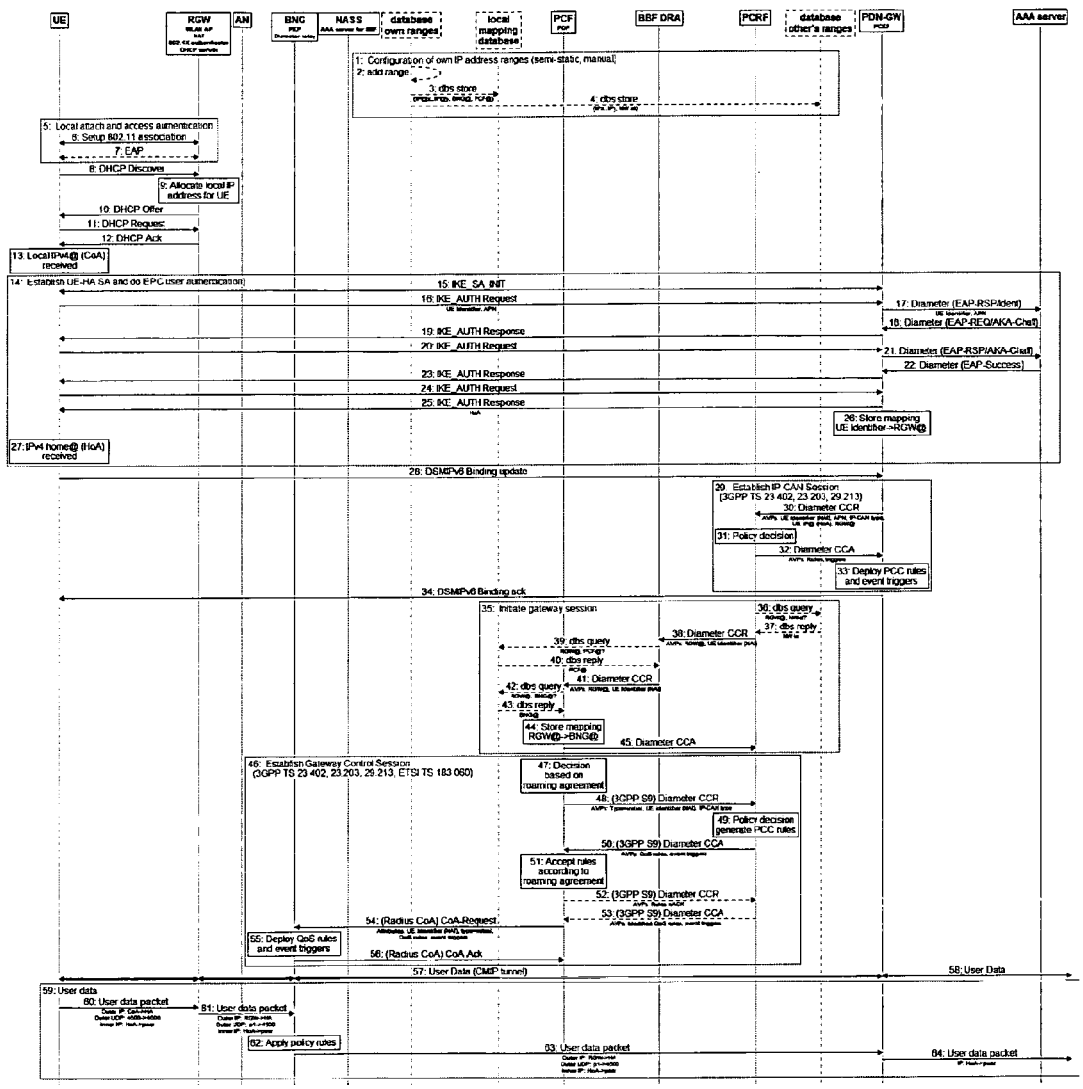
FIG. 8A can be considered to be pictorial rather than textual)
Figure 8B:
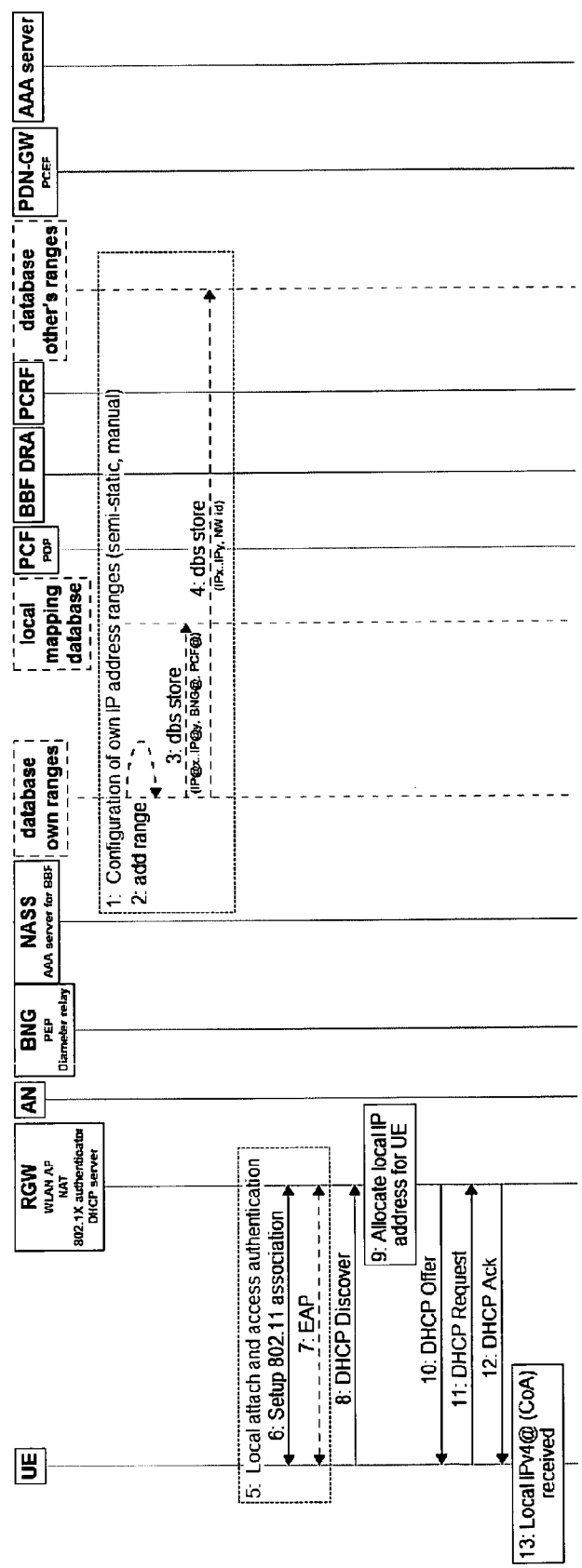
FIG. 8 is a signaling diagram for sharing of IP address ranges based on a distributed mapping database (FIG. 8A shows the entire signaling diagram while FIGS. 8B to 8E show the signaling diagram divided into four respective parts for clarity It is not important if the detail in FIG. 8A is not legible, since the content of FIG. 8A is replicated in FIGS. 8B to 8E.
Figure 8C:
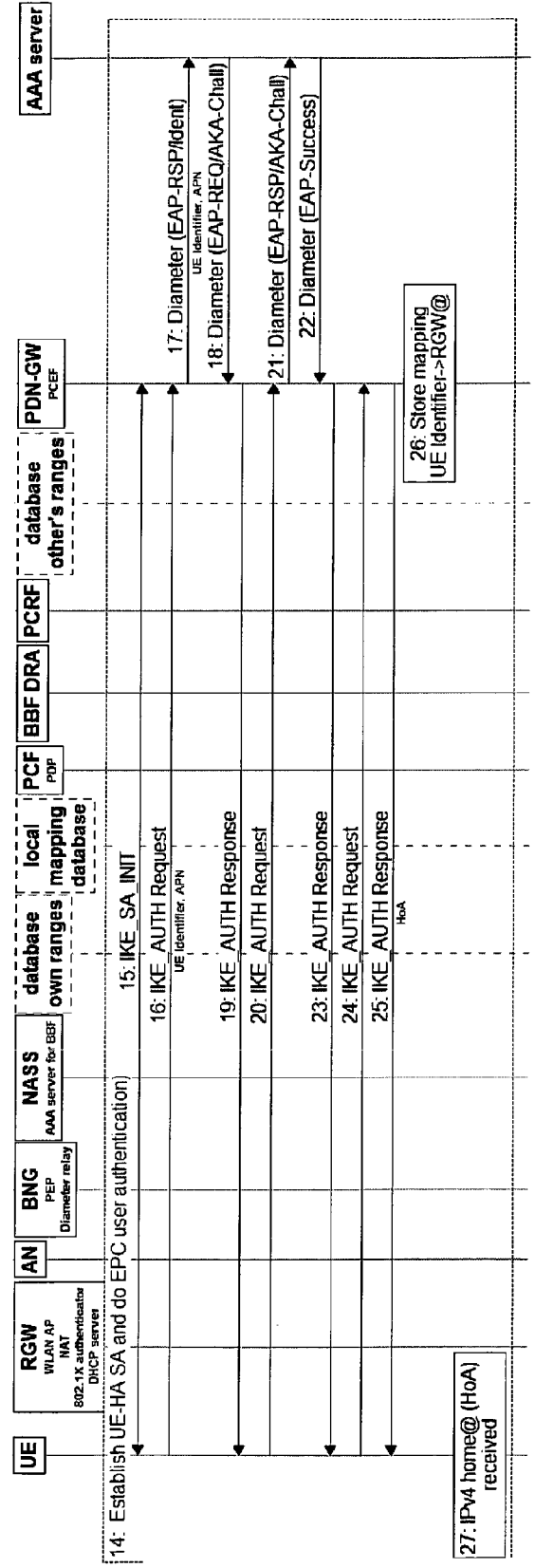
Figure 8D:
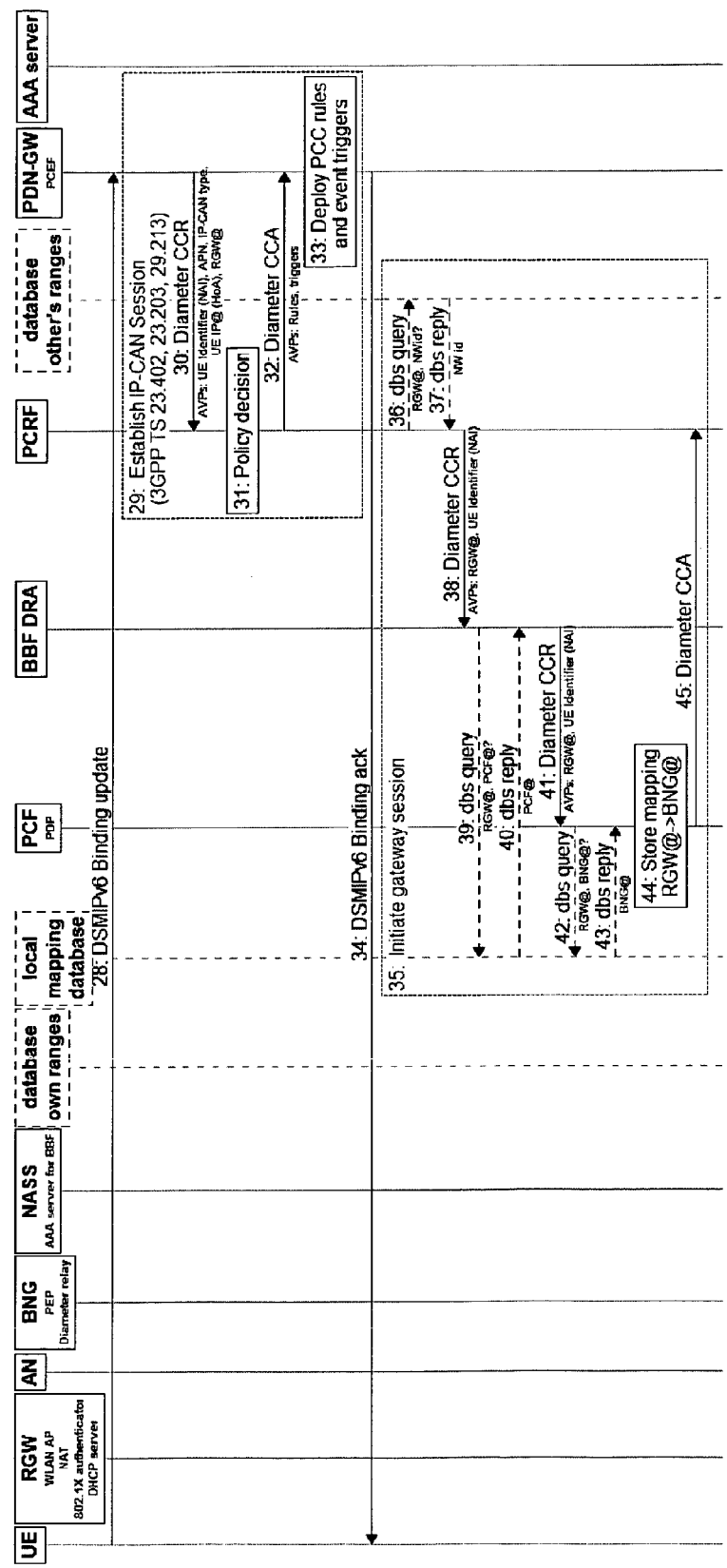
Figure 8E:
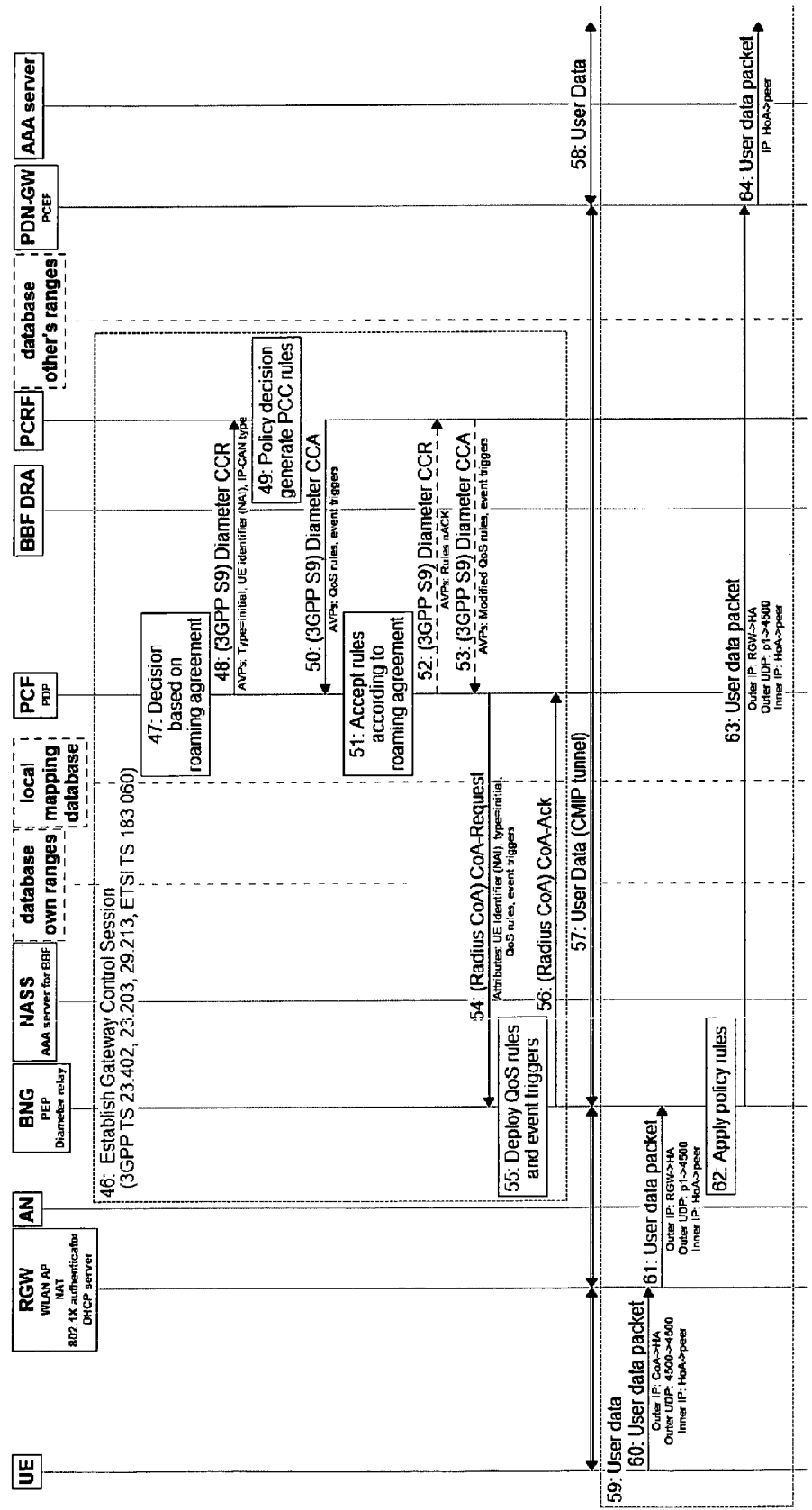

The signaling diagram of FIG. 8 shows in detail one way of implementing a scheme according to the third embodiment (FIG. 8A shows the entire signaling diagram, while FIGS. 8B to 8E show the same signaling diagram divided into four parts for clarity).

Within the BBF domain, there is a local mapping database listing which IP address ranges are served by which BNG and which BNG is served by which BPCF. This database is not further specified here; most likely such a database already exists within the BBF domain today (e.g. as part of the A-RACF). Using that local mapping database, the DRA can find out which BPCF to address given a UE/NAT address. Similarly, the BPCF can find out which BNG to address.

Each BBF operator informs all networks it has a roaming agreement with about the address blocks it uses to assign addresses to UEs/NATs. These blocks are stored in the PCRF in the EPC domain; i.e. the PCRF maintains a list of ranges mapped to (BBF) network id. Using the UE/NAT address, the PCRF queries this list in order to find the network id. Using the network id, the correct BBF network can be addressed.

Note that the EPC domain might contain multiple PCRFs. In that case, a Diameter Routing Agents (DRA) is used as defined in TS 29.213. This is not shown in the signaling diagrams here.

The block called "configuration of own IP address ranges" serves as an illustration. It is not in detail specified here how this block shall be implemented. This can be manually set up or partly automated.

It will be appreciated that operation of one or more of the above-described steps can be controlled by a program operating on the device or node or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

Figure 9:
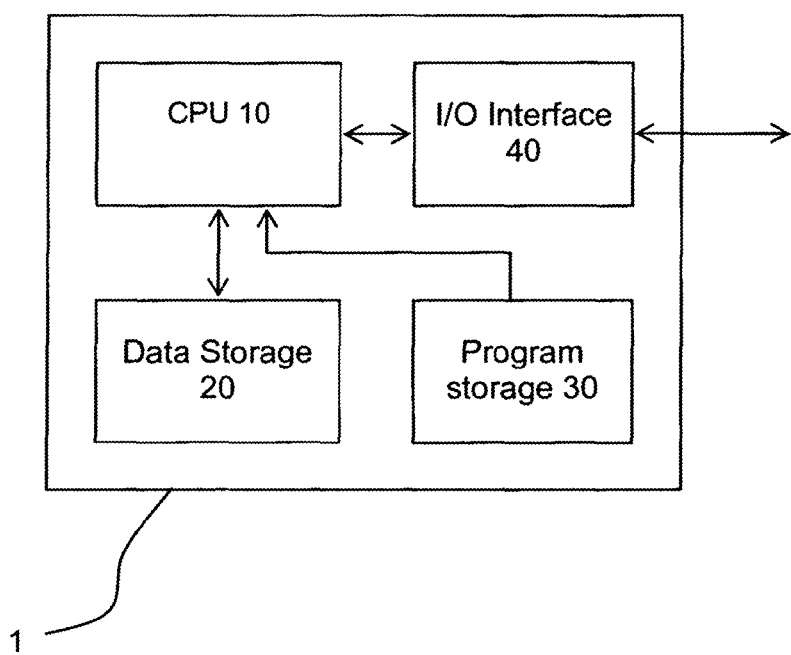
FIG. 9 is a schematic illustration of a node in which a method embodying the present invention is implemented.

FIG. 9 is a schematic illustration of a node 1 in which a method embodying the present invention is implemented. A computer program for controlling the node 1 to carry out a method embodying the present invention is stored in a program storage 30. Data used during the performance of a method embodying the present invention is stored in a data storage 20. During performance of a method embodying the present invention, program steps are fetched from the program storage 30 and executed by a Central Processing Unit (CPU) 10, retrieving data as required from the data storage 20.

Output information resulting from performance of a method embodying the present invention can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

Each of the appended signaling diagrams can be considered not only to depict a series of messages exchanged and method steps performed by the various nodes, but also to depict apparatus for exchanging those messages or performing those method steps. For example, the PCRF of FIG. 6 can be considered to comprise apparatus for performing the reverse DNS lookup of step 39 (though this may be implemented in one embodiment using a program executed by a CPU such as is shown in FIG. 9).

Figure 10:
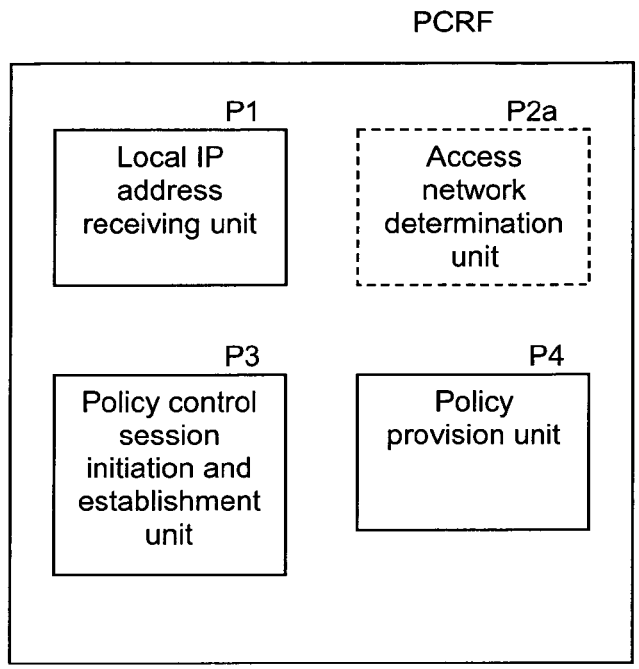
FIG. 10 is a schematic illustration of a policy server node in a 3GPP core network according to an embodiment of the present invention.
Figure 11:
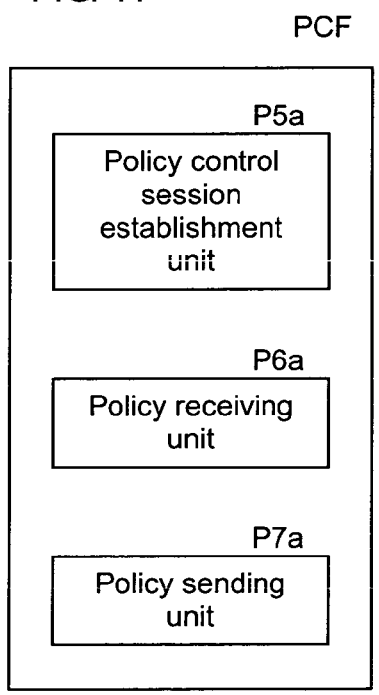
FIG. 11 is a schematic illustration of a policy server node in a non-3GPP access network according to an embodiment of the present invention.
Figure 12:
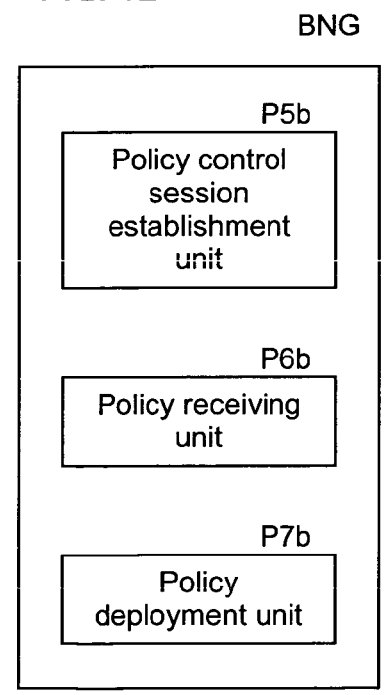
FIG. 12 is a schematic illustration of a gateway node in a non-3GPP access network according to an embodiment of the present invention.

Apparatus suitable for use as the PCRF, PCF and BNG of FIGS. 5 to 8 is shown respectively and schematically in FIGS. 10 to 12. Because of the applicability of the present invention to networks and protocols other than those as specifically described above, the PCRF can be referred to as a policy server (or a policy and charging rules function), the PCF as a policy server (or policy control function), and the BNG as a gateway node (or border gateway node).

Figure 13:
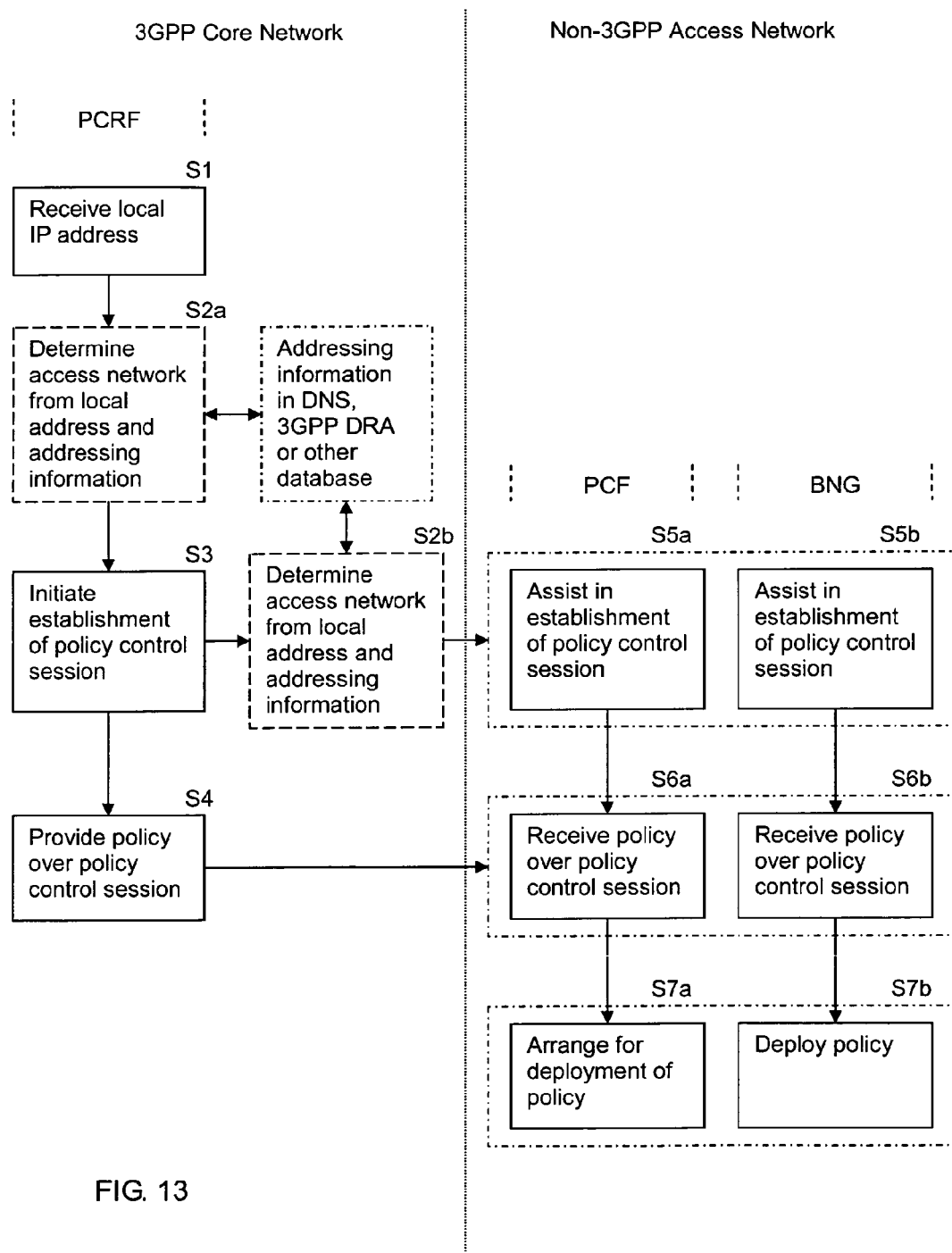
FIG. 13 is a schematic flow chart illustrating steps performed in accordance with an embodiment of the present invention.

A method according to an embodiment of the present invention of deploying a policy from a 3GPP core network to a non-3GPP access network is illustrated schematically in FIG. 13. The policy relates to a connection established from a mobile terminal (e.g. UE) to the 3GPP core network via the non-3GPP access network. The correspondence between the steps of FIG. 13 and those of FIGS. 5 to 8 is described below.

The policy server (PCRF) of FIG. 10 comprises parts P1, P2a, P3 and P4 configured to perform steps S1, S2a, S3 and S4 respectively of FIG. 13. The policy server (PCF) of FIG. 11 comprises parts P5a, P6a, and P7a configured to perform steps S5a, S6a, and S7a respectively of FIG. 13. The gateway node (BNG) of FIG. 12 comprises parts P5b, P6b, and P7b configured to perform steps S5b, S6b, and S7b respectively of FIG. 13. Part P1 is a local IP address receiving unit. Part P2a is an access network determination unit. Part P3 is a policy control session initiation and establishment unit. Part P4 is a policy provision unit. Part P5a is a policy control session establishment unit. Part P6a is a policy receiving unit. Part P7a is a policy sending unit (or policy deployment arrangement unit). Part P5b is a policy control session establishment unit. Part P6b is a policy receiving unit. Part P7b is a policy deployment unit. It will be appreciated that such units may be formed in hardware, or may be enabled by a program as mentioned above, or a combination of these. For example, referring to FIG. 9, each of one or more of these units may effectively be provided by suitable program steps fetched from the program storage 30 and executed by the CPU 10, retrieving data as required from the data storage 20. One or more of the units may also be combined together.

In step S1 of FIG. 13, a local IP address is received at the policy server (PCRF) in the 3GPP core network by part P1. The local IP address is that which was acquired by the mobile terminal during establishment of the connection. Referring to the earlier Summary section, this corresponds generally to step (3), and to that part of step (4) that refers to receipt of the local IP address. This also corresponds generally to step 32 of FIG. 6, step 34 of FIG. 7, and step 29 of FIG. 8.

In step S3 of FIG. 13, establishment of a policy control session is initiated by part P3 of the policy server (PCRF) from the 3GPP core network to the non-3GPP access network. This policy control session is referred to elsewhere herein as a gateway control session or gateway session. In close relationship to step S3, the local IP address received in step S1 is used by the policy server (PCRF) to determine (step S2a), or to enable determination of (step S2b), the non-3GPP access network used for the connection with reference to shared IP addressing information. The shared IP addressing information sets out different respective ranges of local IP addresses assigned to a plurality of such non-3GPP access networks. Step S2a is performed by part P2a of the policy server (PCRF). Step S2b, as an alternative to step S2a, would be performed by another node in the 3GPP core network (such as a 3GPP DRA). Referring to the earlier Summary section, steps S2a/b and S3 correspond generally to step (4). Step S3 also corresponds generally to step 38 of FIG. 6, step 40 of FIG. 7, and step 35 of FIG. 8. Step S2a also corresponds generally to step 39 of FIG. 6, and step 36 of FIG. 8. Step S2b also corresponds generally to step 43 of FIG. 7.

In this respect, the shared IP addressing information may be stored in a DNS database or another database maintained in the 3GPP core network, such that step S2a/b involves performing a lookup operation in the database based on the local IP address to determine the non-3GPP access network used for the connection, or providing the local IP address to another node to enable that node to perform such a lookup operation based on the local IP address. The DNS option is described in the first embodiment with reference to FIG. 6, with step S2a being the reverse DNS lookup of step 39. The option of using a database other than a DNS database is described in the second and third embodiments with reference to FIGS. 7 and 8 respectively.

In the second embodiment (FIG. 7) the other database is a 3GPP DRA, with the policy server (PCRF) providing the local IP address to the 3GPP DRA in step 42 of FIG. 7 to enable the 3GPP DRA to determine the non-3GPP access network used for the connection in step 43 of FIG. 7. In the third embodiment (FIG. 8) the other database is maintained by the policy server (PCRF), with the policy server (PCRF) determining the non-3GPP access network used for the connection in step 36 of FIG. 8. The other database may also be in a node remote from the policy server (PCRF), with the policy server (PCRF) retrieving the information from the remote node.

As a counterpart to step S3, the policy server (PCF) and gateway node (BNG) of the non-3GPP access network cooperate to assist, in steps S5a and S5b using parts P5a and P5b respectively, in the establishment of the policy control session (establishment of the policy control session having been initiated by the 3GPP core network as described above with reference to step S3). Referring to the earlier Summary section, steps S5a/b correspond in some sense to step (5). Step S5 a also corresponds generally to steps 38 and 43 of FIG. 6, steps 40 and 48 of FIG. 7, and steps 35 and 46 of FIG. 8, or at least those parts of these steps that relate to the policy server (PCF). Step S5b also corresponds generally to steps 38 and 43 of FIG. 6, steps 40 and 48 of FIG. 7, and steps 35 and 46 of FIG. 8, or at least those parts of these steps that relate to the gateway node (BNG).

In step S4, part P4 of the policy server (PCRF) provides the policy to the non-3GPP access network using the policy control session established as a result of steps S3, S5a and S5b. The policy is for deployment in the non-3GPP access network in relation to the established connection, and such use is described above generally in the Summary section and referred to in the section before that. Step S4 corresponds generally to step 47 of FIG. 6, step 52 of FIG. 7, and step 50 of FIG. 8 (each relating to the provision of QoS rules).

In steps S6a and S6b, the policy is received over the policy control session by the policy server (PCF) and gateway node (BNG) respectively, using parts P6a and P6b. Step S6a corresponds generally to step 48 of FIG. 6, step 53 of FIG. 7, and step 51 of FIG. 8. Step S6b corresponds generally to step 51/52 of FIG. 6, step 56/57 of FIG. 7, and step 54/55 of FIG. 8.

In step S7a, part P7a of the policy server (PCF) arranges for the deployment of the policy in relation to the established connection, by sending the policy to the gateway node (BNG), such that step S7a precedes step S6b. Step S7a corresponds generally to step 51 of FIG. 6, step 56 of FIG. 7, and step 54 of FIG. 8.

In step S7b, part P7b of the gateway node (BNG) deploys the policy in relation to the established connection. Step S7b corresponds generally to step 52 of FIG. 6, step 57 of FIG. 7, and step 55 of FIG. 8.

As was mentioned previously, it is also possible for the policy control session to be established directly between the PCRF and the BNG using the Gxx interface.

The policy described above may be or may comprise a QoS policy, but an embodiment of the present invention is useful for deploying other types of policy from a 3GPP core network to a non-3GPP access network. The 3GPP core network may comprise an Evolved Packet Core network. The non-3GPP access network may comprise a BBF network.

3GPP TR 23.839 V0.3.0 sets out a study on support of BBF access interworking, covering both S2c and S2b. Although S2a (as discussed previously) is not covered in 3GPP TR 23.839 V0.3.0, it will be appreciated by the person of skill in the art that PCRF-initiated gateway control session establishment according to an embodiment of the present invention can be used for S2a, S2b and S2c.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. The terms "3GPP" and "non-3GPP" in the appended claims are to be construed accordingly. Likewise, an embodiment of the present invention is not restricted to a non-3GPP access network such as the BBF, but is applicable to any non-3GPP access network.

APPENDIX

The signaling diagrams of FIGS. 4, 6, 7 and 8 were generated using the "msc-generator" tool available from https://sourceforge.net/projects/msc-generator/. This is a tool to draw signaling diagrams (Message Sequence Charts) for telecommunication applications from a textual description. For completeness, the full textual description used to generate each of FIGS. 4, 6, 7 and 8 is included below. The textual descriptions below include some coloring and shading effects to convey additional information not apparent from the appended signaling diagrams.

Textual description for FIG. 4:

```
msc {
hscale=auto, compress=yes, numbering=yes;
defcolor light_green="205,255,215";
defcolor light_red="250,185,175";
defstyle nodebox [fill.color=lgray, fill.gradient=up,
vline.color=lgray];
UE [nodebox, label="\bUE"],
RGW [nodebox, label="\bRGW\n\sWLAN AP\nNAT\n802.1X
authenticator\nDHCP server"],
AN [nodebox, label="\bAN"],
BNG [nodebox, label="\bBNG\n\-PEP\nDiameter relay"],
NASS [nodebox, label="\bNASS\n\-AAA server for BBF"],
PCF [nodebox, label="\bPCF\n\-PDP"],
PCRF [nodebox, label="\bPCRF"],
PDN [nodebox, label = "\bPDN-GW\n\-PCEF"],
AAA [nodebox, label="\bAAA server"];
RGW--BNG: Establish fixed ISP session;
...:\c(125,125,125) Local attach and access authentication
[fill.color=light_green, fill.gradient=down]{
    UE<->RGW: Setup 802.11 association;
    UE--RGW: 802.1X controlled port blocked;
    RGW->UE: EAP-REQ/Ident;
    UE->RGW: EAP-RSP/Ident;
    RGW->BNG->AAA: Diameter (EAP-RSP/Ident)\n\-UE Identifier (NAI);
    AAA->BNG->RGW: Diameter (EAP-REQ/AKA'-Chall);
    RGW->UE: EAP-REQ/AKA'-Chall;
    UE->RGW: EAP-RSP/AKA'-Chall;
    RGW->BNG->AAA: Diameter (EAP-RSP/AKA'-Chall);
    AAA->BNG->RGW: Diameter (EAP-REQ/AKA'-Notif);
    RGW->UE: EAP-REQ/AKA'-Notif;
    UE->RGW: EAP-RSP/AKA'-Notif;
    RGW->BNG->AAA: Diameter (EAP-RSP/AKA'-Notif);
    AAA->BNG: Diameter (EAP-Success);
    BNG--BNG: Trigger to start\nGateway Control Session;
    BNG->RGW: Diameter (EAP-Success);
    RGW->UE: EAP-Success;
    RGW<->UE: EAPOL-Key (4-way handshake);
    UE--RGW: 802.1X controlled port unblocked;
};
UE->RGW: DHCP Discover;
RGW--RGW: Allocate local IP\naddress for UE;
UE<-RGW: DHCP Offer;
UE->RGW: DHCP Request;
UE<-RGW: DHCP Ack;
UE--UE: Local IPv4@ (CoA)\nreceived;
...:\c(125,125,125) Establish Gateway Control Session\n (3GPP TS
23.402, 23.203, 29.213, ETSI TS 183 060) [fill.color=light_red,
fill.gradient=down]{
    BNG->PCF:\c(red) (Radius CoA) Access-Request\n\-
Attributes: RGW Identifier (IP@),\nUE Identifier (NAI);
    PCF--PCF: Decide to forward\nbased on\nroaming agreement;
    PCF->PCRF: (3GPP S9) Diameter CCR\n\-AVPs: Type=initial,
UE identifier (NAI), IP-CAN type;
    PCRF--PCRF: Policy decision\ngenerate PCC rules;
    PCRF->PCF: (3GPP S9) Diameter CCA\n\-AVPs: QoS rules,
event triggers;
    PCF--PCF: Accept rules\naccording to\nroaming agreement;
    PCF>>PCRF: (3GPP S9) Diameter CCR\n\-AVPs: Rules nACK;
    PCRF>>PCF: (3GPP S9) Diameter CCA\n\-AVPs: Modified QoS
rules, event triggers;
    PCF->BNG:\c(red) (Radius CoA) Access-Accept\n\-Attributes:
UE identifier (NAI), type=initial, \nQoS rules, event triggers;
    BNG--BNG: Deploy QoS rules\nand event triggers;
};
...:\c(125,125,125) Establish UE-HA SA and do EPC user
authentication) [fill.color=light_green, fill.gradient=down]{
    UE<->PDN: IKE_SA_INIT;
    UE->PDN: IKE_AUTH Request\n\-UE Identifier, APN;
    PDN->AAA: Diameter (EAP-RSP/Ident)\n\-UE Identifier, APN;
    AAA->PDN: Diameter (EAP-REQ/AKA-Chall);
    PDN->UE: IKE_AUTH Response;
    UE->PDN: IKE_AUTH Request;
    PDN->AAA: Diameter (EAP-RSP/AKA-Chall);
    AAA->PDN: Diameter (EAP-Success);
    PDN->UE: IKE_AUTH Response;
    UE->PDN: IKE_AUTH Request;
    PDN->UE: IKE_AUTH Response\n\-HoA;
    UE--UE: IPv4 home@ (HoA)\nreceived;
};
UE->PDN: DSMIPv6 Binding update;
...:\c(125,125,125) Establish IP-CAN Session\n (3GPP TS 23.402,
23.203, 29.213) [fill.color=light_red, fill.gradient=down]{
    PDN->PCRF: Diameter CCR\n\-AVPs: UE Identifier (NAI), APN,
IP-CAN type, IP address;
    PCRF--PCRF: Policy decision;
    PCRF->PDN: Diameter CCA\n\-AVPs: Rules, triggers;
    PDN--PDN: Deploy PCC rules\nand event triggers;
};
UE<-PDN: DSMIPv6 Binding ack;
...:\c(125,125,125) Gateway Control and QoS Rules Provision
Session\n (3GPP TS 23.402, 23.203, 29.213, ETSI TS 183 060)
[fill.color=light_red, fill.gradient=down]{
    PCRF->PCF: (3GPP S9) Diameter RAR\n\-AVPs: Rules,
triggers;
```

```
    PCF--PCF: Accept rules\naccording to\nroaming agreement;
    PCF->BNG:\c(red) (Radius CoA) CoA-Request\n\-Attributes:
UE identifier, type=update,\nQoS rules, event triggers;
        BNG--BNG: Deploy QoS rules\nand event triggers;
        BNG->PCF:\c(red) (Radius CoA) CoA-Ack;
    PCF->PCRF: Diameter RAA\n\-AVPs: ack;
};
{UE<=>RGW-BNG-PDN: User Data (CMIP tunnel) [color=blue];}
{PDN<->: User Data [color=blue];};
..: User data {
    UE->RGW: User data packet\n\-Outer IP: CoA->HA\nOuter UDP:
4500->4500\nInner IP: HoA->peer;
    RGW->BNG: User data packet\n\-Outer IP: RGW->HA\nOuter
UDP: p1->4500\nInner IP: HoA->peer;
        BNG--BNG: Apply policy rules;
        BNG->PDN: User data packet\n\-Outer IP: RGW->HA\nOuter
UDP: p1->4500\nInner IP: HoA->peer;
    PDN->: User data packet\n\-IP: HoA->peer;
};
}
```

Textual description for FIG. 6:

```
msc {
hscale=auto, compress=yes, numbering=yes;
defcolor light_green="205,255,215";
defcolor light_red="250,185,175";
defcolor light_yellow="255,255,160";
defcolor light_blue="171,219,255";
defstyle nodebox [fill.color=lgray, fill.gradient=up,
vline.color=lgray];
UE [nodebox, label="\bUE"],
RGW [nodebox, label="\bRGW\n\sWLAN AP\nNAT\n802.1X
authenticator\nDHCP server", fill.color=light_blue],
AN [nodebox, label="\bAN", fill.color=light_blue],
BNG [nodebox, label="\bBNG\n\-PEP\nDiameter relay",
fill.color=light_blue],
NASS [nodebox, label="\bNASS\n\-AAA server for BBF",
fill.color=light_blue],
dbs_own_ranges [nodebox, label="\bdatabase\nown IP ranges",
line.type=dashed, vline.type=dashed, fill.color=light_blue],
PCF [nodebox, label="\bPCF\n\-PDP", fill.color=light_blue],
VDRA [nodebox, label="\bDRA", fill.color=light_blue],
PCRF [nodebox, label="\bPCRF"],
PDN [nodebox, label="\bPDN-GW\n\-PCEF"],
AAA [nodebox, label="\bAAA server"];
..:\c(125,125,125) Configuration of own IP address ranges (semi-
static, manual) [fill.color=light_yellow, fill.gradient=down]{
    dbs_own_ranges>>dbs_own_ranges: \c(red)add range;
    dbs_own_ranges--dbs_own_ranges: "\c(red)Store in DNS
server\n\-IPx..IPy -> NW id";
    dbs_own_ranges>>VDRA: \c(red)IPx..IPy -> PCF@;
    VDRA--VDRA: \c(red)update realm\nrouting table;
    dbs_own_ranges>>PCF: \c(red)IPx..IPy -> BNG@;
    PCF--PCF: \c(red)Store mapping\nRGW@->BNG@;
};
..:\c(125,125,125) Local attach and access authentication
[fill.color=light_green, fill.gradient=down]{
    UE<->RGW: Setup 802.11 association;
    UE<<>>RGW: EAP;
};
UE->RGW: DHCP Discover;
RGW--RGW: Allocate local IP\naddress for UE;
UE<-RGW: DHCP Offer;
UE->RGW: DHCP Request;
UE<-RGW: DHCP Ack;
UE--UE: Local IPv4@ (CoA)\nreceived;
..:\c(125,125,125) Establish UE-HA SA and do EPC user
authentication) [fill.color=light green, fill.gradient=down]{
    UE<->PDN: IKE_SA_INIT;
    UE->PDN: IKE_AUTH Request\n\-UE Identifier, APN;
    PDN->AAA: Diameter (EAP-RSP/Ident)\n\-UE Identifier, APN;
    AAA->PDN: Diameter (EAP-REQ/AKA-Chall);
    PDN->UE: IKE_AUTH Response;
    UE->PDN: IKE_AUTH Request;
    PDN->AAA: Diameter (EAP-RSP/AKA-Chall);
    AAA->PDN: Diameter (EAP-Success);
    PDN->UE: IKE_AUTH Response;
    UE->PDN: IKE_AUTH Request;
    PDN->UE: IKE_AUTH Response\n\-HoA;
    PDN--PDN: Store mapping\nUE Identifier->RGW@;
    UE--UE: IPv4 home@ (HoA)\nreceived;
};
UE->PDN: DSMIPv6 Binding update;
..:\c(125,125,125) Establish IP-CAN Session\n (3GPP TS 23.402,
23.203, 29.213) [fill.color=light_red, fill.gradient=down]{
    PDN->PCRF: Diameter CCR\n\-AVPs: UE Identifier (NAI), APN,
IP-CAN type,\n UE IP@ (HoA), \c(red)RGW@;
    PCRF--PCRF: Policy decision;
    PCRF->PDN: Diameter CCA\n\-AVPs: Rules, triggers;
    PDN--PDN: Deploy PCC rules\nand event triggers;
};
UE<-PDN: DSMIPv6 Binding ack;
..:\c(125,125,125) Initiate gateway session
[fill.color=light_yellow, fill.gradient=down]{
    PCRF--PCRF: \c(red)Reverse DNS lookup:\nFind NW id using
RGW@;
    PCRF->VDRA: \c(red) Diameter CCR\n\-AVPs: RGW@, UE
Identifier (NAI);
    VDRA->PCF: \c(red) Diameter CCR\n\-AVPs: RGW@, UE
Identifier (NAI);
    PCF->PCRF: \c(red) Diameter CCA;
};
..:\c(125,125,125) Establish Gateway Control Session\n (3GPP TS
23.402, 23.203, 29.213, ETSI TS 183 060) [fill.color=light_red,
fill.gradient=down]{
    PCF--PCF: Decision\nbased on\nroaming agreement;
    PCF->PCRF: (3GPP S9) Diameter CCR\n\-AVPs: Type=initial,
UE identifier (NAI), IP-CAN type;
    PCRF--PCRF: Policy decision\ngenerate PCC rules;
    PCRF->PCF: (3GPP S9) Diameter CCA\n\-AVPs: QoS rules,
event triggers;
    PCF--PCF: Accept rules\naccording to\nroaming agreement;
    PCF>>PCRF: (3GPP S9) Diameter CCR\n\-AVPs: Rules nACK;
    PCRF>>PCF: (3GPP S9) Diameter CCA\n\-AVPs: Modified QoS
rules, event triggers;
    PCF->BNG:\c(red) (Radius CoA) CoA-Request\n\-Attributes:
UE Identifier (NAI), type=initial,\nQoS rules, event triggers;
        BNG--BNG: Deploy QoS rules\nand event triggers;
        BNG->PCF:\c(red) (Radius CoA) CoA-Ack;
};
{UE<=>RGW-BNG-PDN: User Data (CMIP tunnel) [color=blue];}
{PDN<->: User Data [color=blue];};
..: User data {
    UE->RGW: User data packet\n\-Outer IP: CoA->HA\nOuter UDP:
4500->4500\nInner IP: HoA->peer;
    RGW->BNG: User data packet\n\-Outer IP: RGW->HA\nOuter
UDP: p1->4500\nInner IP: HoA->peer;
        BNG--BNG: Apply policy rules;
        BNG->PDN: User data packet\n\-Outer IP: RGW->HA\nOuter
UDP: p1->4500\nInner IP: HoA->peer;
    PDN->: User data packet\n\-IP: HoA->peer;
};
}
```

Textual description for FIG. 7:

```
msc {
hscale=auto, compress=yes, numbering=yes;
defcolor light_green="205,255,215";
defcolor light_red="250,185,175";
defcolor light_yellow="255,255,160";
defcolor light_blue="171,219,255";
defstyle entity [fill.color=lgray, fill.gradient=up,
vline.color=lgray];
UE [label="\bUE"],
RGW [label="\bRGW\n\sWLAN AP\nNAT\n802.1X
authenticator\nDHCP
server", fill.color=light_blue],
AN [label="\bAN", fill.color=light_blue],
BNG [label="\bBNG\n\-PEP\nDiameter relay",
fill.color=light_blue],
NASS [label="\bNASS\n\-AAA server for BBF",
fill.color=light_blue],
```

-continued

```
dbs_own_ranges [entity, label="\bdatabase\nown IP ranges",
line.type=dashed, vline.type=dashed, fill.color=light_blue],
PCF [label="\bPCF\n\-PDP", fill.color=light_blue],
VDRA [label="\bBBF DRA", fill.color=light_blue],
HDRA [label="\b3GPP DRA"],
PCRF [label="\bPCRF"],
PDN [label="\bPDN-GW\n\-PCEF"],
AAA [label="\bAAA server"];
...:\c(125,125,125) Configuration of own IP address
ranges\n(semi-static, manual) [fill.color=light_yellow,
fill.gradient=down]{
    nudge;
    dbs_own_ranges>>dbs_own_ranges: \c(red)add range;
    dbs_own_ranges>>VDRA: \c(red)IPx..IPy -> NW id;
    VDRA>>HDRA: \c(red)IPx..IPy -> NW id;
    HDRA--HDRA: \c(red)update realm\nrouting table;
    dbs_own_ranges>>VDRA: \c(red)IPx..IPy -> PCF@;
    VDRA--VDRA: \c(red)update realm\nrouting table;
    dbs_own_ranges>>PCF: \c(red)IPx..IPy -> BNG@;
    PCF--PCF: \c(red)Store mapping\nRGW@->BNG@;
};
...:\c(125,125,125) Local attach and access authentication
[fill.color=light_green, fill.gradient=down]{
    UE<->RGW: Setup 802.11 association;
    UE<<>>RGW: EAP;
};
UE->RGW: DHCP Discover;
RGW--RGW: Allocate local IP\naddress for UE;
UE<-RGW: DHCP Offer;
UE->RGW: DHCP Request;
UE<-RGW: DHCP Ack;
UE--UE: Local IPv4@ (CoA)\nreceived;
...:\c(125,125,125) Establish UE-HA SA and do EPC user
authentication) [fill.color=light_green, fill.gradient=down]{
    UE<->PDN: IKE_SA_INIT;
    UE->PDN: IKE_AUTH Request\n-UE Identifier, APN;
    PDN->AAA: Diameter (EAP-RSP/Ident)\n\-UE Identifier, APN;
    AAA->PDN: Diameter (EAP-REQ/AKA-Chall);
    PDN->UE: IKE_AUTH Response;
    UE->PDN: IKE_AUTH Request;
    PDN->AAA: Diameter (EAP-RSP/AKA-Chall);
    AAA->PDN: Diameter (EAP-Success);
    PDN->UE: IKE_AUTH Response;
    UE->PDN: IKE_AUTH Request;
    PDN->UE: IKE_AUTH Response\n-HoA;
    PDN--PDN: Store mapping\nUE Identifier->RGW@;
    UE--UE: IPv4 home@ (HoA)\nreceived;
};
UE->PDN: DSMIPv6 Binding update;
...:\c(125,125,125) Establish IP-CAN Session\n (3GPP TS 23.402,
23.203, 29.213) [fill.color=light_red, fill.gradient=down]{
    PDN->PCRF: Diameter CCR\n\-AVPs: UE Identifier (NAI), APN,
IP-CAN type,\n UE IP@ (HoA), \c(red)RGW@;
    PCRF--PCRF: Policy decision;
    PCRF->PDN: Diameter CCA\n\-AVPs: Rules, triggers;
    PDN--PDN: Deploy PCC rules\nand event triggers;
};
UE<-PDN: DSMIPv6 Binding ack;
...:\c(125,125,125) Initiate gateway session
[fill.color=light_yellow, fill.gradient=down]{
    PCRF--PCRF: \c(red)Generare realm\nfrom RGW@;
    PCRF->HDRA: \c(red) Diameter CCR\n\-AVPs: RGW@, UE
Identifier (NAI), \bDest. Realm;
    HDRA--HDRA: \c(red)Route based on\ndestination realm;
    HDRA->VDRA: \c(red) Diameter CCR\n\-AVPs: RGW@, UE
Identifier (NAI), \bDest. Realm;
    VDRA->PCF: \c(red) Diameter CCR\n\-AVPs: RGW@, UE
Identifier (NAI), \bDest. Realm;
    PCF--PCF: \c(red)Store mapping\nNAI->RGW@;
    PCF->VDRA-HDRA-PCRF: \c(red) Diameter CCA;
};
...:\c(125,125,125) Establish Gateway Control Session\n (3GPP TS
23.402, 23.203, 29.213, ETSI TS 183 060) [fill.color=light_red,
fill.gradient=down]{
    PCF--PCF: Decision\nbased on\nroaming agreement;
    PCF->PCRF: (3GPP S9) Diameter CCR\n\-AVPs: Type=initial,
UE identifier (NAI), IP-CAN type;
    PCRF--PCRF: Policy decision\ngenerate PCC rules;
    PCRF->PCF: (3GPP S9) Diameter CCA\n\-AVPs: QoS rules,
event triggers;
    PCF--PCF: Accept rules\naccording to\nroaming agreement;
    PCF>>PCRF: (3GPP S9) Diameter CCR\n\-AVPs: Rules nACK;
    PCRF>>PCF: (3GPP S9) Diameter CCA\n\-AVPs: Modified QoS
rules, event triggers;
    PCF->BNG:\c(red) (Radius CoA) CoA-Request\n\-Attributes:
UE Identifier (NAI), type=initial,\nQoS rules, event triggers;
    BNG--BNG: Deploy QoS rules\nand event triggers;
    BNG->PCF:\c(red) (Radius CoA) CoA-Ack;
};
{UE<=>RGW-BNG-PDN: User Data (CMIP tunnel) [color=blue];}
{PDN<->: User Data [color=blue];};
..: User data {
    UE->RGW: User data packet\n\-Outer IP: CoA->HA\nOuter UDP:
4500->4500\nInner IP: HoA->peer;
    RGW->BNG: User data packet\n\-Outer IP: RGW->HA\nOuter
UDP: p1->4500\nInner IP: HoA->peer;
    BNG--BNG: Apply policy rules;
    BNG->PDN: User data packet\n\-Outer IP: RGW->HA\nOuter
UDP: p1->4500\nInner IP: HoA->peer;
    PDN->: User data packet\n\-IP: HoA->peer;
};
}
```

Textual description for FIG. 8:

```
msc {
hscale=auto, compress=yes, numbering=yes;
defcolor light_green="205,255,215";
defcolor light_red="250,185,175";
defcolor light_yellow="255,255,160";
defcolor light_blue="171,219,255";
defstyle nodebox [fill.color=lgray, fill.gradient=up,
vline.color=lgray];
UE [nodebox, label="\bUE"],
RGW [nodebox, label="\bRGW\n\sWLAN AP\nNAT\n802.1X
authenticator\nDHCP server", fill.color=light blue],
AN [nodebox, label="\bAN", fill.color=light_blue],
BNG [nodebox, label="\bBNG\n\-PEP\nDiameter relay",
fill.color=light_blue],
NASS [nodebox, label="\bNASS\n\-AAA server for BBF",
fill.color=light_blue],
dbs_own_ranges [nodebox, label="\bdatabase\nown ranges",
line.type=dashed, vline.type=dashed, fill.color=light_blue],
dbs_local_map [nodebox, label="\blocal\nmapping\ndatabase",
line.type=dashed, vline.type=dashed, fill.color=light_blue],
PCF [nodebox, label="\bPCF\n\-PDP", fill.color=light_blue],
VDRA [nodebox, label="\bDRA", fill.color=light_blue],
PCRF [nodebox, label="\bPCRF"],
dbs_other_ranges [nodebox, label="\bdatabase\nother's ranges",
line.type=dashed, vline.type=dashed],
PDN [nodebox, label="\bPDN-GW\n\-PCEF"],
AAA [nodebox, label="\bAAA server"];
...:\c(125,125,125) Configuration of own IP address ranges (semi-
static, manual) [fill.color=light yellow, fill.gradient=down]{
    dbs_own_ranges>>dbs_own_ranges: \c(red)add range;
    dbs_own_ranges>>dbs_local_map: "\c(red)dbs store\n\-
(IP@x..IP@y, BNG@, PCF@)";
    dbs_own_ranges>>dbs_other_ranges: "\c(red)dbs store\n\-
(IPx..IPy, NW id)";
};
...:\c(125,125,125) Local attach and access authentication
[fill.color=light_green, fill.gradient=down]{
    UE<->RGW: Setup 802.11 association;
    UE<<>>RGW: EAP;
};
UE->RGW: DHCP Discover;
RGW--RGW: Allocate local IP\naddress for UE;
UE<-RGW: DHCP Offer;
UE->RGW: DHCP Request;
UE<-RGW: DHCP Ack;
UE--UE: Local IPv4@ (CoA)\nreceived;
...:\c(125,125,125) Establish UE-HA SA and do EPC user
authentication) [fill.color=light_green, fill.gradient=down]{
    UE<->PDN: IKE_SA_INIT;
    UE->PDN: IKE_AUTH Request\n-UE Identifier, APN;
    PDN->AAA: Diameter (EAP-RSP/Ident)\n\-UE Identifier, APN;
```

-continued

```
    AAA->PDN: Diameter (EAP-REQ/AKA-Chall);
    PDN->UE: IKE_AUTH Response;
    UE->PDN: IKE_AUTH Request;
    PDN->AAA: Diameter (EAP-RSP/AKA-Chall);
    AAA->PDN: Diameter (EAP-Success);
    PDN->UE: IKE_AUTH Response;
    UE->PDN: IKE_AUTH Request;
    PDN->UE: IKE_AUTH Response\n\-HoA;
    PDN--PDN: Store mapping\nUE Identifier->RGW@;
  UE--UE: IPv4 home@ (HoA)\nreceived;
};
UE->PDN: DSMIPv6 Binding update;
...\:\c(125,125,125) Establish IP-CAN Session\n (3GPP TS 23.402,
23.203, 29.213) [fill.color=light_red, fill.gradient=down]{
    PDN->PCRF: Diameter CCR\n\-AVPs: UE Identifier (NAI), APN,
IP-CAN type,\n UE IP@ (HoA), \c(red)RGW@;
    PCRF--PCRF: Policy decision;
    PCRF->PDN: Diameter CCA\n\-AVPs: Rules, triggers;
    PDN--PDN: Deploy PCC rules\nand event triggers;
};
UE<-PDN: DSMIPv6 Binding ack;
...\:\c(125,125,125) Initiate gateway session
[fill.color=light yellow, fill.gradient=down]{
    PCRF>>dbs_other_ranges: \c(red)dbs query\n\-RGW@, NWid?;
    dbs_other_ranges>>PCRF: \c(red)dbs reply\n\-NW id;
    PCRF->VDRA: \c(red) Diameter CCR\n\-AVPs: RGW@, UE
Identifier (NAI);
    VDRA>>dbs_local_map: \c(red)dbs query\n\-RGW@, PCF@?;
    dbs_local_map>>VDRA: \c(red)dbs reply\n\-PCF@ ;
    VDRA->PCF: \c(red) Diameter CCR\n\-AVPs: RGW@, UE
Identifier (NAI);
    PCF>>dbs_local_map: \c(red)dbs query\n\-RGW@, BNG@?;
    dbs_local_map>>PCF: \c(red)dbs reply\n\-BNG@;
    PCF--PCF: Store mapping\nRGW@->BNG@;
    PCF->PCRF: \c(red) Diameter CCA;
};
...\:\c(125,125,125) Establish Gateway Control Session\n (3GPP TS
23.402, 23.203, 29.213, ETSI TS 183 060) [fill.color=light_red,
fill.gradient=down]{
    PCF--PCF: Decision\nbased on\nroaming agreement;
    PCF->PCRF: (3GPP S9) Diameter CCR\n\-AVPs: Type=initial,
UE identifier (NAI), IP-CAN type;
    PCRF--PCRF: Policy decision\ngenerate PCC rules;
    PCRF->PCF: (3GPP S9) Diameter CCA\n\-AVPs: QoS rules,
event triggers;
    PCF--PCF: Accept rules\naccording to\nroaming agreement;
    PCF>>PCRF: (3GPP S9) Diameter CCR\n\-AVPs: Rules nACK;
    PCRF>>PCF: (3GPP S9) Diameter CCA\n\-AVPs: Modified QoS
rules, event triggers;
    PCF->BNG:\c(red) (Radius CoA) CoA-Request\n\-Attributes:
UE Identifier (NAI), type=initial,\nQoS rules, event triggers;
    BNG--BNG: Deploy QoS rules\nand event triggers;
    BNG->PCF:\c(red) (Radius CoA) CoA-Ack;
};
{UE<=>RGW-BNG-PDN: User Data (CMIP tunnel) [color=blue];}
{PDN<->: User Data [color=blue];};
..: User data {
    UE->RGW: User data packet\n\-Outer IP: CoA->HA\nOuter UDP:
4500->4500\nInner IP: HoA->peer;
    RGW->BNG: User data packet\n\-Outer IP: RGW->HA\nOuter
UDP: p1->4500\nInner IP: HoA->peer;
    BNG--BNG: Apply policy rules;
    BNG->PDN: User data packet\n\-Outer IP: RGW->HA\nOuter
UDP: p1->4500\nInner IP: HoA->peer;
    PDN->: User data packet\n\-IP: HoA->peer;
};
}
```

The invention claimed is:

1. A method of deploying a policy from a 3GPP core network to a non-3GPP access network, the policy relating to a connection established from a mobile terminal to the 3GPP core network via the non-3GPP access network, the method comprising, at the 3GPP core network:
(a) receiving a local IP address, the local IP address having been acquired by the mobile terminal during establishment of the connection;
(b) initiating establishment of a policy control session from the 3GPP core network to the non-3GPP access network, using the local IP address received in step (a) to determine or to enable determination of the non-3GPP access network used for the connection with reference to shared IP addressing information, the shared IP addressing information setting out different respective ranges of local IP addresses assigned to a plurality of such non-3GPP access networks; and
(c) providing the policy to the non-3GPP access network using the policy control session established as a result of step (b), the policy being for deployment in the non-3GPP access network in relation to the established connection.

2. The method of claim 1, wherein the steps (a), (b) and (c) are performed by a policy server in the 3GPP core network.

3. The method of claim 1, wherein the shared IP addressing information is stored in a Domain Name System (DNS) database or another database maintained in the 3GPP core network, and step (b) comprises performing a lookup operation in the database based on the local IP address to determine the non-3GPP access network used for the connection, or providing the local IP address to another node to enable the another node to perform such a lookup operation based on the local IP address.

4. The method of claim 3, wherein the another database is a Diameter Routing Agent (DRA), further comprising providing the local IP address to the DRA to enable the DRA to determine the non-3GPP access network used for the connection.

5. The method of claim 3, wherein the another database is maintained in the policy server.

6. The method of claim 1, wherein the policy is or comprises a Quality of Service (QOS) policy.

7. The method of claim 1, wherein the mobile terminal comprises a User Equipment (UE).

8. The method of claim 1, wherein the 3GPP core network comprises an Evolved Packet Core network.

9. The method of claim 1, wherein the non-3GPP access network comprises a Broad Band Forum (BBF) network.

10. An apparatus for use in a 3GPP core network for deploying a policy from the 3GPP core network to a non-3GPP access network, the policy relating to a connection established from a mobile terminal to the 3GPP core network via the non-3GPP access network, and the apparatus comprising:
a processor;
memory with instructions that, when executed by the processor, cause the apparatus to:
(a) receive a local IP address, the local IP address having been acquired by the mobile terminal during establishment of the connection;
(b) initiate establishment of a policy control session from the 3GPP core network to the non-3GPP access network, using the received local IP address to determine or to enable determination of the non-3GPP access network used for the connection with reference to shared IP addressing information, the shared IP addressing information setting out different respective ranges of local IP addresses assigned to a plurality of such non-3GPP access networks; and
(c) provide the policy to the non-3GPP access network using the established policy control session, the policy being for deployment in the non-3GPP access network in relation to the established connection.

11. The apparatus of claim 10, wherein the apparatus is a policy server in the 3GPP core network.

12. The apparatus of claim 10, wherein the shared IP addressing information is stored in a Domain Name System (DNS) database or another database maintained in the 3GPP core network, wherein the instructions, when executed, further cause the apparatus to perform a lookup operation in the database based on the local IP address to determine the non-3GPP access network used for the connection, or provide the local IP address to another node to enable the another node to perform such a lookup operation based on the local IP address.

13. The apparatus of claim 12, wherein the another database is a Diameter Routing Agent (DRA), further comprising providing the local IP address to the DRA to enable the DRA to determine the non-3GPP access network used for the connection.

14. The apparatus of claim 12, wherein the another database is maintained in the policy server.

15. The apparatus of claim 10, wherein the policy is or comprises a Quality of Service (QOS) policy.

16. The apparatus of claim 10, wherein the mobile terminal comprises a User Equipment (UE).

17. The apparatus of claim 10, wherein the 3GPP core network comprises an Evolved Packet Core network.

18. The apparatus of claim 10, wherein the non-3GPP access network comprises a Broad Band Forum (BBF) network.

* * * * *